US012787905B2

(12) United States Patent
Dhobale et al.

(10) Patent No.: US 12,787,905 B2
(45) Date of Patent: Nov. 10, 2026

(54) APPARATUS AND METHOD FOR A DUAL FRONT FOLD TOOLBAR ASSEMBLY

(71) Applicant: DEERE & COMPANY, Moline, IL (US)

(72) Inventors: Dnyanesh K. Dhobale, Parbhani (IN); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 848 days.

(21) Appl. No.: 18/100,029

(22) Filed: Jan. 23, 2023

(65) Prior Publication Data

US 2024/0244989 A1 Jul. 25, 2024

(51) Int. Cl.
*A01B 73/04* (2006.01)
*A01B 63/28* (2006.01)

(52) U.S. Cl.
CPC ............ *A01B 73/044* (2013.01); *A01B 63/28* (2013.01)

(58) Field of Classification Search
None
See application file for complete search history.

(56) References Cited

U.S. PATENT DOCUMENTS 3,360,053 A * 12/1967 Francis .................. A01B 39/19 172/311
4,066,274 A * 1/1978 Adee .................... A01B 73/062 172/581
4,596,290 A 6/1986 Bedney
6,076,613 A 6/2000 Frasier
2018/0255695 A1* 9/2018 Kinzenbaw .......... A01B 73/005

FOREIGN PATENT DOCUMENTS

CA 2313362 * 7/2000 ............. A01B 73/06
CA 2313362 A1 * 7/2002
CA 2966460 A1 * 1/2018 ........... A01C 21/002
CA 3061112 A1 * 6/2020 ........... A01B 73/044
EP 2099278 B1 10/2010
EP 3466234 A1 4/2019
EP 3466234 B1 * 7/2023 ........... A01B 73/065

OTHER PUBLICATIONS

Extended European Search Report and Written Opinion issued in European Patent Application No. 23217221.3 dated Jun. 14, 2024, in 07 pages.

* cited by examiner

*Primary Examiner* — Christopher J Sebesta
*Assistant Examiner* — Alfred H Tsui
(74) *Attorney, Agent, or Firm* — Taft Stettinius & Hollister LLP; Stephen F. Rost

(57) ABSTRACT

An agricultural assembly that has a frame, a hitch assembly coupled to the frame and configured to selectively couple the frame to a work machine, a first tool bar assembly configured to receive at least one row unit assembly, the first toolbar assembly being foldable in a first direction towards the hitch assembly and a second tool bar assembly configured to receive at least one row unit assembly, the second toolbar assembly being foldable in the first direction towards the hitch assembly. The agricultural assembly is movable between a planting configuration and a transport configuration and both the first tool bar assembly and the second tool bar assembly fold towards the hitch assembly as the first tool bar and second tool bar transition from the planting configuration to the transport configuration.

18 Claims, 29 Drawing Sheets

APPARATUS AND METHOD FOR A DUAL FRONT FOLD TOOLBAR ASSEMBLY

FIELD OF THE DISCLOSURE

The present disclosure relates to a folding toolbar assembly, and more particularly to a toolbar assembly that has dual front-folding toolbars.

BACKGROUND OF THE DISCLOSURE

In current seeding tools, there are multiple ranks of planting units to effectively achieve narrow row spacing as there is not typically enough room on a toolbar to achieve narrow row spacing with all row units on single tool bar. Having multiple ranks has issues with ground following, row pairing, and accessibility issues for operators to access meters for maintenance, crop change-overs, and other potentially needed row-unit adjustments. Further, having multiple ranks creates issues with transporting the seeding tool among other things.

SUMMARY

One embodiment is an agricultural assembly that has a frame, a hitch assembly coupled to the frame and configured to selectively couple the frame to a work machine, a first tool bar assembly configured to receive at least one row unit assembly, the first toolbar assembly being foldable in a first direction towards the hitch assembly and a second tool bar assembly configured to receive at least one row unit assembly, the second toolbar assembly being foldable in the first direction towards the hitch assembly. The agricultural assembly is movable between a planting configuration and a transport configuration and both the first tool bar assembly and the second tool bar assembly fold towards the hitch assembly as the first tool bar and second tool bar transition from the planting configuration to the transport configuration.

In one example of this embodiment, the first tool bar assembly has a first center section with a first forward side wing pivotally coupled to the first center section on one side and a second forward side wing pivotally coupled to the first center section on the other side, wherein the first and second forward side wing are pivotable relative to the first center section in the first direction. In part of this example, the second tool bar assembly comprises a second center section and first rearward side wing and a second rearward side wing pivotally coupled to the second center section on opposing sides, wherein the second center section is slidable axially along a longitudinal axis relative to the first center section to transition the second toolbar assembly between the planting configuration and the transport configuration. Further, in the transport configuration the second center section is spaced from the first center section sufficiently far to allow the first and second rearward side wings to pivot to the transport configuration wherein the first and second rearward side wings are axially behind the first center section along the longitudinal axis relative to the hitch assembly. In another part of this example, the at least one row unit coupled to the second tool bar assembly is coupled to a rockshaft of the second tool bar assembly, wherein the rockshaft pivots the at least one row unit between the planting configuration and the transport configuration.

In one example, the first center section is fixedly coupled to the frame and actuators are coupled between each of the first and second forward side wings and at least one of the frame or the first center section to selectively pivot the first and second forward side wings between the planting configuration and the transport configuration.

In another example, the first center section is slidably coupled to the frame to move axially along the longitudinal axis relative to the frame to selectively pivot the first and second forward side wings between the planting configuration and the transport configuration. In part of this example, the second center section is slidably coupled to the frame through the first center section such that axial movement of the first center section relative to the frame causes axial movement of the second center section relative to the frame. Further, the second center section is slidable along the longitudinal axis relative to the first center section to selectively pivot the first and second rearward side wings between the planting configuration and the transport configuration.

Another part of this example has a first forward wing extension movably coupled to the first forward side wing and a second forward wing extension movably coupled to the second forward side wing, wherein the first and second forward wing extensions are movable relative to the first and second forward side wings to be positioned at least partially above the respective first and second forward side wing in the transport configuration. Further, a first forward four bar linkage assembly couples the first forward wing extension to the first forward side wing and a second forward four bar linkage assembly couples the second forward wing extension to the second forward side wing.

Yet another example has a first rearward wing extension movably coupled to the first rearward side wing and a second rearward wing extension movably coupled to the second rearward side wing, wherein the first and second rearward wing extensions are movable relative to the first and second rearward side wings to be positioned at least partially above the corresponding first and second rearward side wing in the transport configuration. Part of this example has a third four bar linkage assembly coupling the first rearward wing extension to the first rearward side wing and a fourth four bar linkage assembly coupling the second rearward wing extension to the second rearward side wing.

Another example has a first forward wing extension movably coupled to the first forward side wing, a second forward wing extension movably coupled to the second forward side wing, a first rearward wing extension movably coupled to the first rearward side wing, and a second rearward wing extension movably coupled to the second rearward side wing. In this example, the first and second forward wing extensions are movable relative to the corresponding first and second forward side wings and the first and second rearward wing extensions are movable relative to the first and second rearward side wings to be positioned at least partially above the corresponding first and second forward side wings or first and second rearward side wings in the transport configuration. In part of this example, each of the first and second forward wing extensions and first and second rearward wing extensions are movably coupled to the corresponding first and second forward side wings or first and second rearward side wings through separate four bar linkage assemblies.

In yet another example of this embodiment, the first axis and second axis are offset from one another such that the at least one row unit on the first tool bar assembly and the at least one row unit on the second tool bar assembly have a row unit offset that is about the same relative to a wheel axis of wheels rotationally coupled to the frame. In part of this example, the at least one row unit coupled to the first tool bar assembly is a push row unit and the at least one row unit coupled to the second tool bar assembly is a pull row unit. In an alternative part of this example, the at least one row unit coupled to the first tool bar assembly and the at least one row unit coupled to the second tool bar assembly are pull row units.

In another example of this embodiment, the first tool bar assembly has a plurality of row units spaced thereon and the second tool bar assembly has a plurality of row units spaced thereon, wherein the plurality of row units on the first tool bar assembly are configured to provide commodity to every other row relative to the plurality of row units on the second tool bar assembly in the planting configuration.

In yet another example there are toolbar wheels coupled to the first toolbar assembly, wherein in the planting configuration the toolbar wheels contact an underlying surface and in the transport configuration the toolbar wheels are raised from the underlying surface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals indicate corresponding parts throughout the several views.

DETAILED DESCRIPTION

The embodiments of the present disclosure described below are not exhaustive and do not limit the disclosure to the precise forms in the following detailed description. Rather, the embodiments are chosen and described so that others skilled in the art may appreciate and understand the principles and practices of the present disclosure.

Figure 1A:
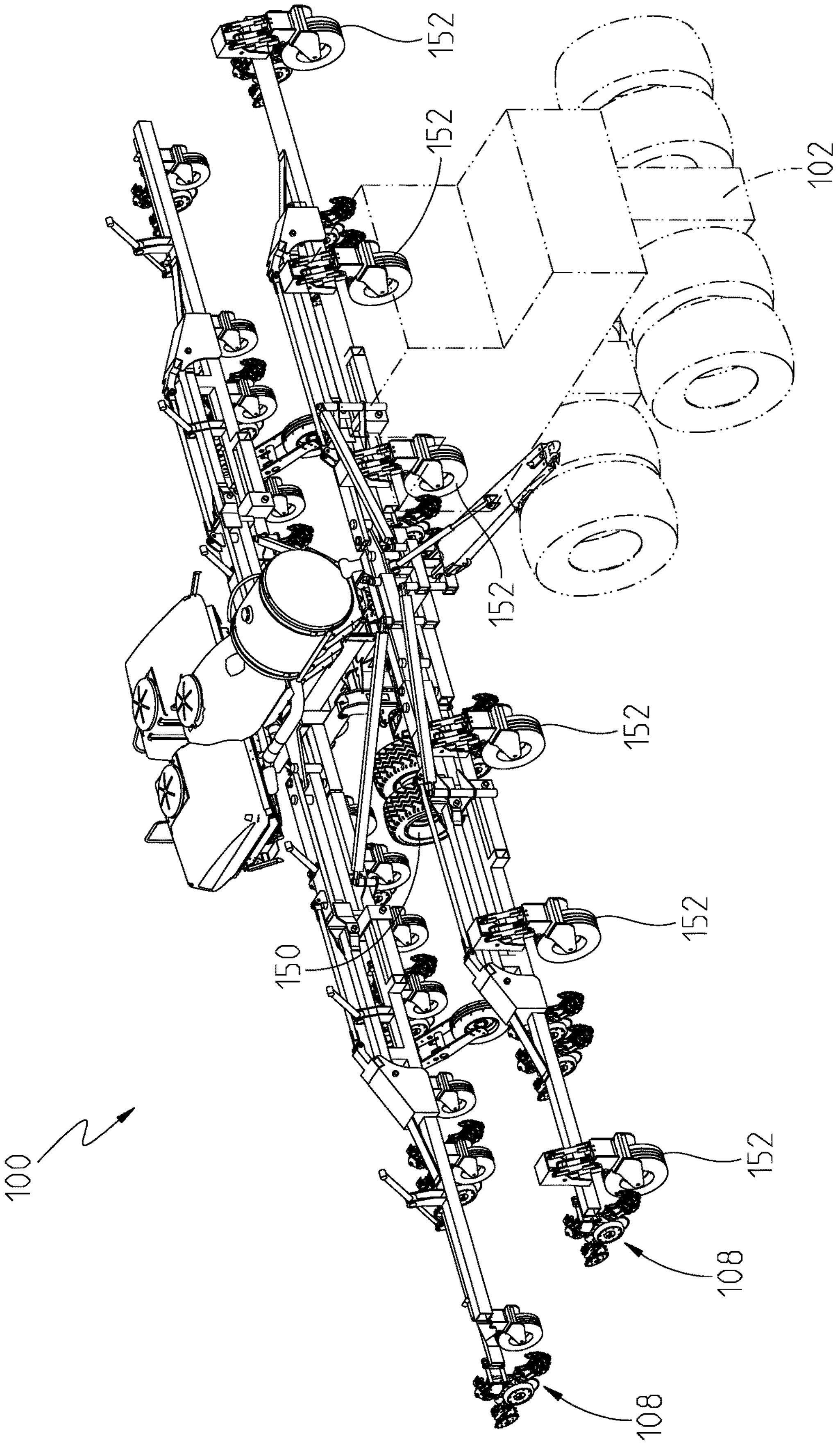
FIG. 1*a* is an elevated perspective view of agricultural assembly coupled to a work machine and in the planting configuration.
Figure 1B:
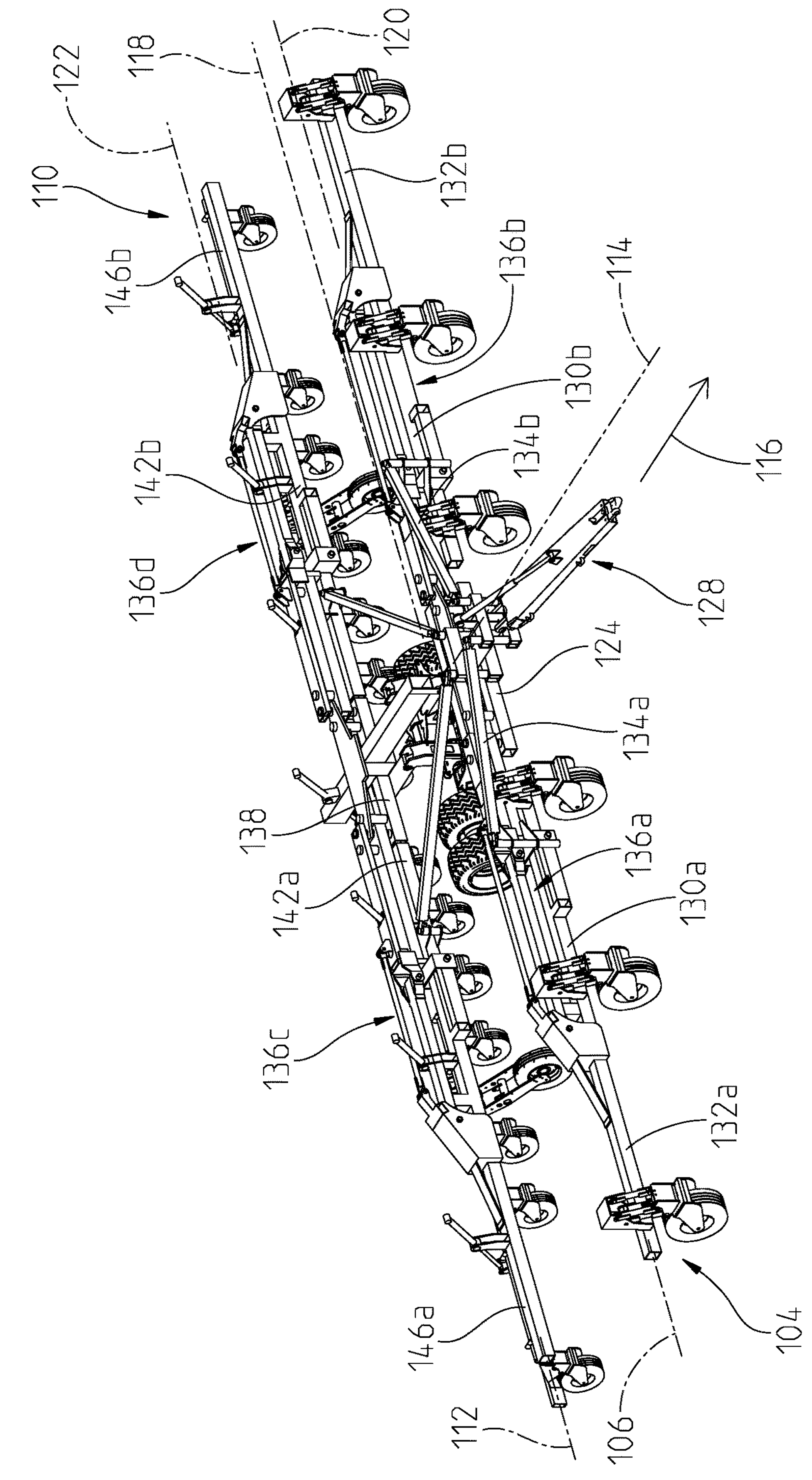
FIG. 1*b* is an elevated perspective view of the agricultural assembly of FIG. 1*a* in the planting configuration.

FIG. 1 illustrates an agricultural assembly 100 coupled to a work machine 102. The work machine 102 may be any vehicle capable of pulling the agricultural assembly 100 over an underlying surface such as a field. The work machine 102 may be powered by gasoline, diesel fuel, electricity, or any other known power source or combination of power sources to move the agricultural assembly 100 along the underlying surface while the agricultural assembly 100 engages the underlying surface. More specifically, the agricultural assembly 100 may have a first toolbar assembly 104 extending along a first axis 106 in the planting configuration of FIGS. 1*a*-1*b*. The first toolbar assembly 104 may be configured to accommodate a plurality of row unit assemblies 108 to manipulate the underlying surface to distribute a commodity therein as the planting assembly 100 is moved along the underlying surface by the work machine 102. For the ease of illustration, only select row units 108 are illustrated. Typically, row units 108 would be spaced evenly across the entire width of the agricultural assembly 100. The commodity distributed by the row units 108 of the agricultural assembly 100 may be one or more of seed, fertilizer, or other known agricultural commodities.

The planting assembly 100 may also have a second toolbar assembly 110 extending along a second axis 112 in the planting configuration of FIGS. 1*a*, 1*b*. The second toolbar assembly 110 may also be configured to accommodate a plurality of row unit assemblies 108 to manipulate the underlying surface to distribute a commodity therein as the planting assembly 100 is moved along the underlying surface by the work machine 102. Both the first and second axes 106, 112 may extend substantially perpendicularly from a longitudinal axis 114 extending through a center section of the planting assembly 100 and along an intended direction of travel 116 thereof. The first and second toolbar assemblies 104, 110 each comprise one or more toolbar coupled to corresponding toolbar frame sections to span the intended width of the corresponding toolbar assembly 104, 110 to allow row units 108 to be spaced about the width of the planting assembly 100. The width of the planting assembly 100 may vary based on the intended application, and the teachings of this disclosure can be applied to any known width of a planting assembly.

In one aspect of this disclosure, the toolbar assemblies 104, 110 are spaced such that a plurality of row units 108 can be positioned on the first toolbar assembly 104 and a plurality of row units 108 can also be positioned on the second toolbar assembly 110. The row units 108 may be spaced such that when they engage the underlying surface, the row units 108 from the first toolbar assembly 104 form rows that alternate with row units 108 of the second toolbar assembly 110. This allows, among other things, the adjacent rows provided commodity by the row units 108 to be closely spaced to one another without the row units 108 contacting one another. In one example, adjacent rows created by the row units 108 may be at or less than 10 inches (25.4 centimeters) from one another. However, this disclosure contemplates row units 108 spaced to generate rows greater than 10 inches (25.4 centimeters) from one another as well.

In the planting configuration, the first and second toolbar assemblies 104, 110 may be spaced from a wheel axis 118 such that a majority of the row units 108 coupled to the first toolbar assembly 104 are selectable to engage the underlying surface at a first row unit offset 120, spaced from the wheel axis 118. Similarly, the row units 108 coupled to the second toolbar assembly 110 may selectively engage the underlying surface at a second row unit offset 122 spaced from the wheel axis 118. The first row unit offset 120 and the second row unit offset 122 may be spaced about the same distance from the wheel axis 118, albeit the first row unit offset 120 is forward of the wheel axis 118 relative to the direction of travel 116 and the second row unit offset 122 is rearward of the wheel axis 118 relative to the direction of travel 116. With the first and second row unit offsets 120, 122 being spaced about the same distance from the wheel axis 118, the alternating row spacing can be significantly maintained during turning events or the like.

In one aspect of this disclosure, the row units 108 of the agricultural assembly 100 may be towed behind the corresponding tool bar. In other words, the row units 108 may be pull-style row units wherein the corresponding tool bar pulls the row units 108 along the underlying surface along the direction of travel 116. However, in other embodiments contemplated herein, the row units 108 may be positioned in front of the corresponding tool bars wherein the tool bars push the row units along the underlying surface relative to the direction of travel 116. Accordingly, this disclosure contemplates using both pull-style and push-style row units with the teachings described herein.

In one aspect of this disclosure, the first toolbar assembly 104 may comprise a first center section 124 slidably coupled to a frame 126. The frame 126 is couplable to the work machine 102 through a hitch assembly 128. A first forward side wing 130*a* and a second forward side wing 130*b* may be pivotally coupled to the first center section 124 and extend therefrom on either side relative to the longitudinal axis 114. Further, a first forward wing extension 132*a* may be pivotally coupled to the first forward side wing 130*a* and a second forward wing extension 132*b* may be pivotally coupled to the second forward side wing 130*b*. In the planting configuration, the center section 124, forward side wings 130*a*, 130*b*, and the forward wing extensions 132*a*, 132*b* are substantially aligned to provide toolbar sections that the row units 108 can be coupled to across the width of the first toolbar assembly 104.

Figure 6A:
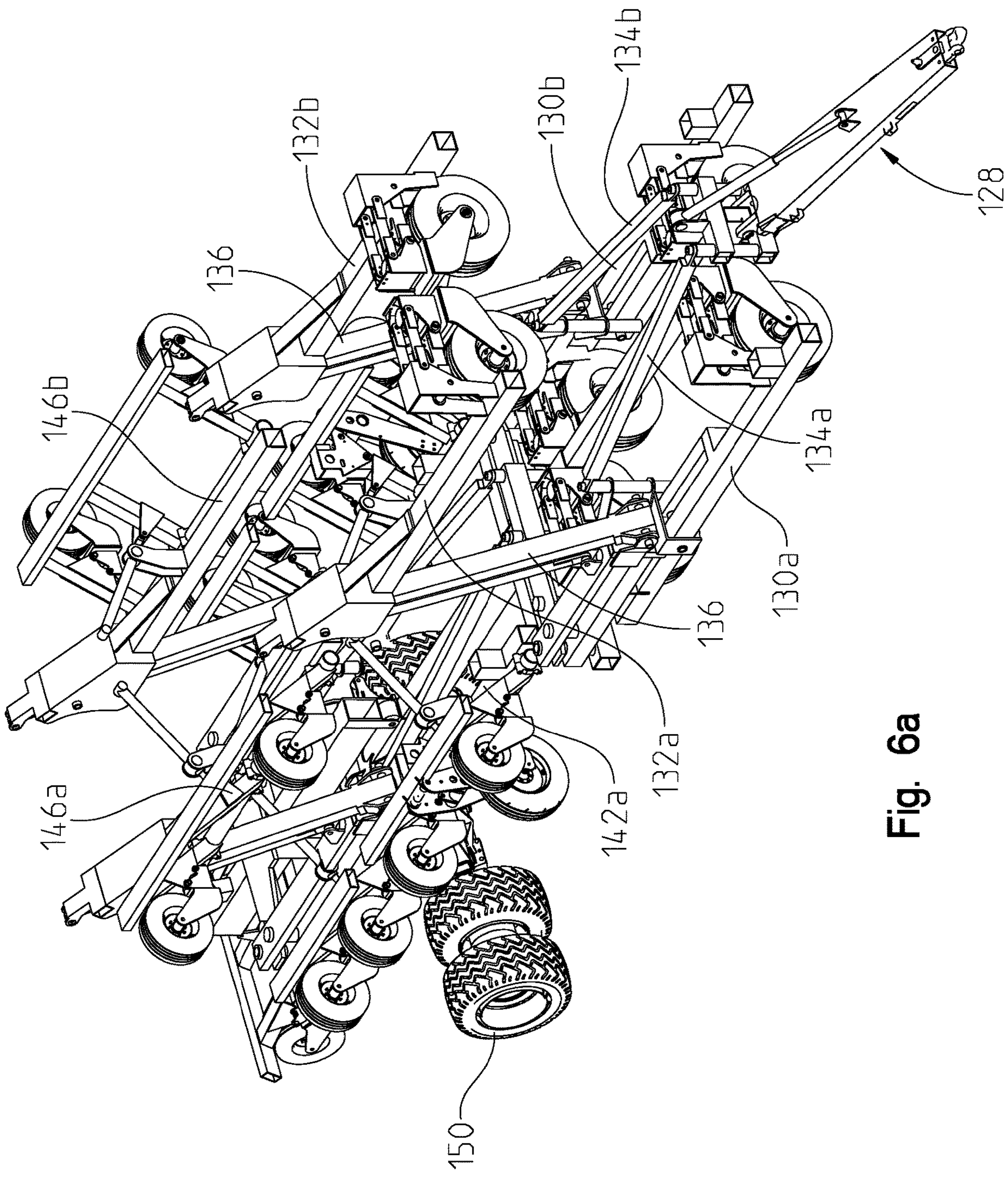
FIG. 6*a* is an elevated perspective view of the agricultural assembly of FIG. 1*a* in a transport configuration.
Figure 6B:
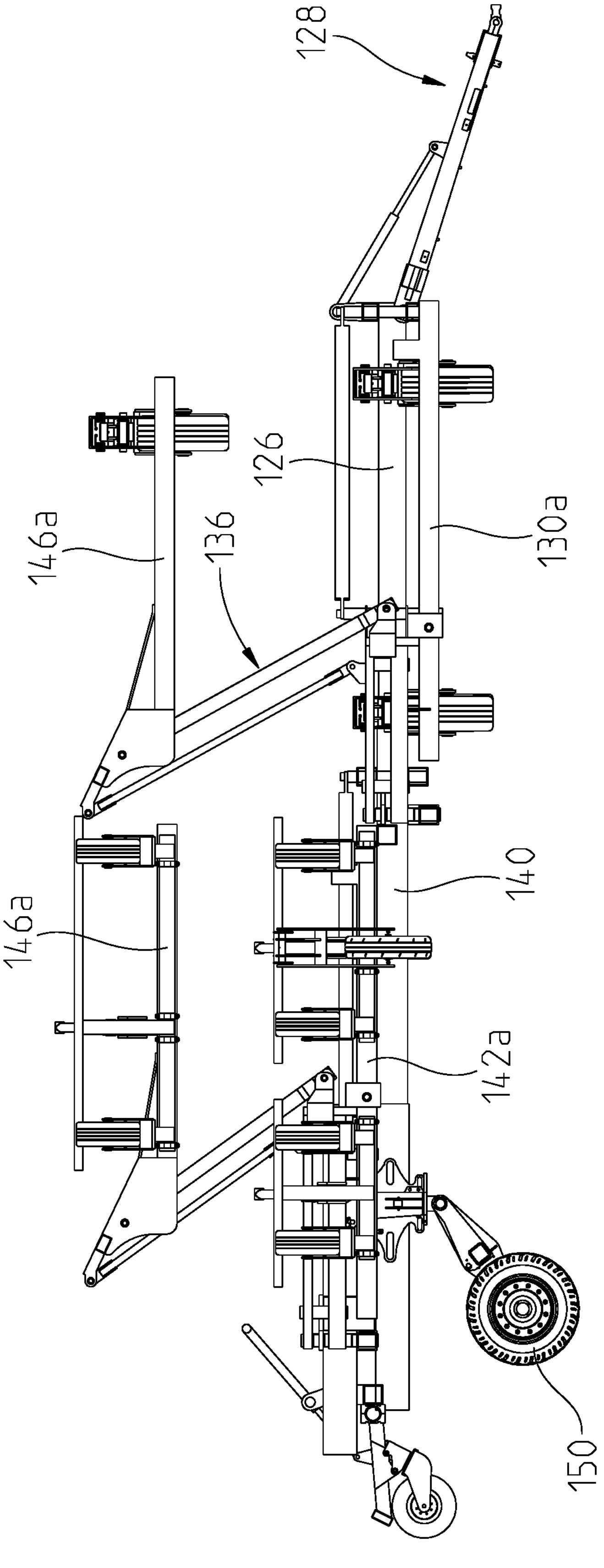
FIG. 6*b* is a side view of the agricultural assembly of FIG. 1*a* in the transport configuration.

In one aspect of this disclosure, the first toolbar assembly 104 is foldable forward relative to the direction of travel 116 towards the hitch assembly 128. More specifically, the first center section 124 is slidable along the frame 126 axially along the longitudinal axis 114 away from the hitch assembly 128. As the first center section 124 slides along the frame 126, first links 134*a*, 134*b* extending from the frame 126 to the corresponding forward side wings 130*a*, 130*b* pivot the forward side wings 130*a*, 130*b* and any corresponding forward wing extensions 132*a*, 132*b* inwardly about first wing pivots 302*a*, 302*b* where about the forward side wings 130*a*, 130*b* are pivotally coupled to the first center section 124. The first center section 124 may be slidable along the frame 126 sufficiently far to allow the forward side wings 130*a*, 130*b* to pivot about ninety degrees towards the frame 126 such that the forward side wings 130*a*, 130*b* are substantially parallel with the frame 126 in a transport configuration as illustrated at least in FIGS. 4*e*, 6*a*, and 6*b*.

The first toolbar assembly 104 may also reposition the forward wing extensions 132*a*, 132*b* prior to, after, or while folding the forward side wings 130*a*, 130*b* inwardly as discussed herein. More specifically, a first forward four-bar linkage assembly 136*a* may pivotally couple the first forward wing extensions 132*a* to the corresponding forward side wing 130*a* and a second forward four-bar linkage assembly 136*b* may pivotally couple the second forward wing extension 132*b* to the corresponding second forward side wing 130*b*. The forward four-bar linkage assemblies 136*a*, 136*b* may be sized to allow the forward wing extensions 132*a*, 132*b* to be substantially aligned with the adjacent forward side wings 130*a*, 130*b* in the planting configuration, but be movable to be at least partially above the adjacent forward side wings 130*a*, 130*b* through the four-bar linkage assemblies 136*a*, 136*b*.

Figure 2A:
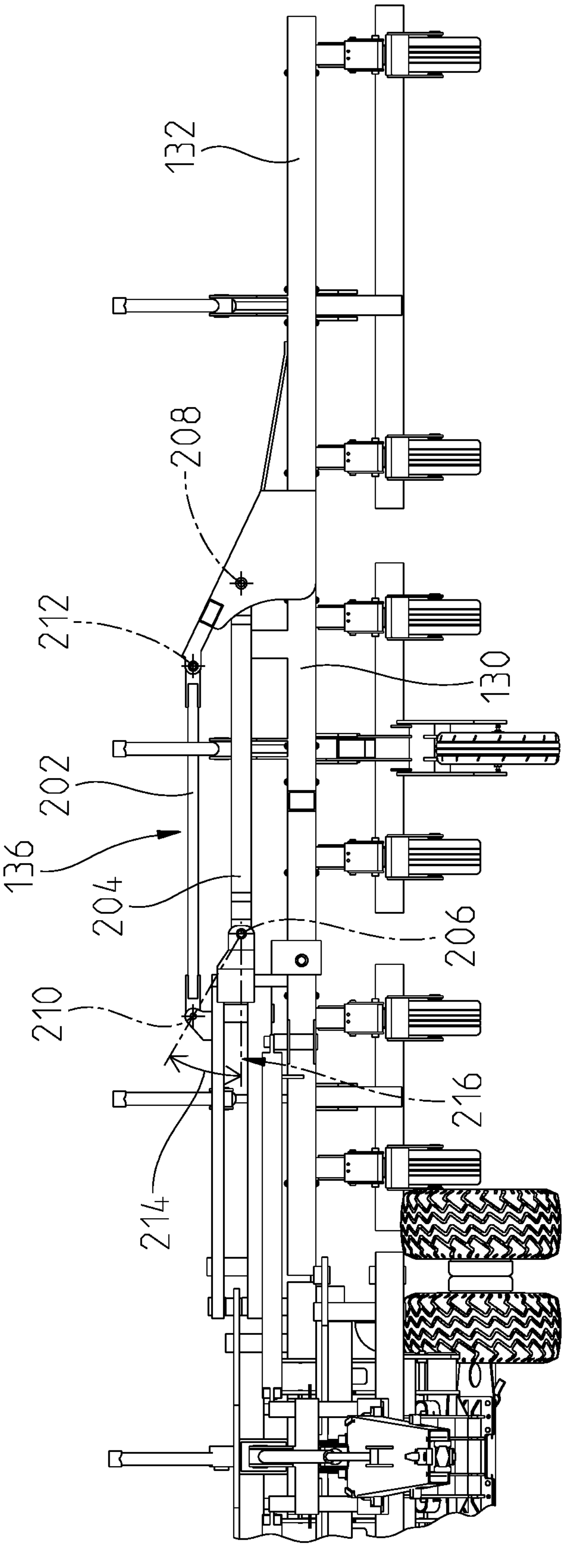
FIG. 2*a* is a detailed section view of a four-bar linkage assembly of the agricultural machine of FIG. 1*a* in the planting configuration.

The specific coupling configuration for one of the four-bar linkage assemblies will be described in more detail herein with reference to FIG. 2*a*. However, the other four-bar linkage assemblies 136*a*, 136*b* may function in substantially the same way albeit with a substantially mirrored configurations. In the example of FIG. 2*a*, a four-bar linkage assembly 136 may have an upper link 202 and a lower link 204 pivotally coupled between a side wing 130 and a wing extension 132. The lower link 204 is pivotally coupled to the side wing 130 about a first lower link axis 206 and to the wing extension 132 at a second lower link axis 208. Similarly, the upper link 206 is pivotally coupled to the side wing 130 about a first upper link axis 210 and to the wing extension 132 at a second upper link axis 212. In one aspect of this disclosure, the first lower link axis 206 and the first upper link axis 210 are positioned along an offset angle 214 from one another relative to a horizontal plane 216. Similarly, the second lower link axis 208 and second upper link axis 212 may be positioned along the offset angle 214 relative to the horizontal plane 216. In this configuration, the four-bar linkage assembly 136 allows the wing extension 132 to be pivotable through the four-bar linkage assembly 136 to transition the wing extension 132, and any row units 108 coupled thereto, to a stacked configuration wherein at least a portion of the wing extension 132 is positioned over the side wing 130 from the perspective of FIG. 2*a*.

Figure 2B:
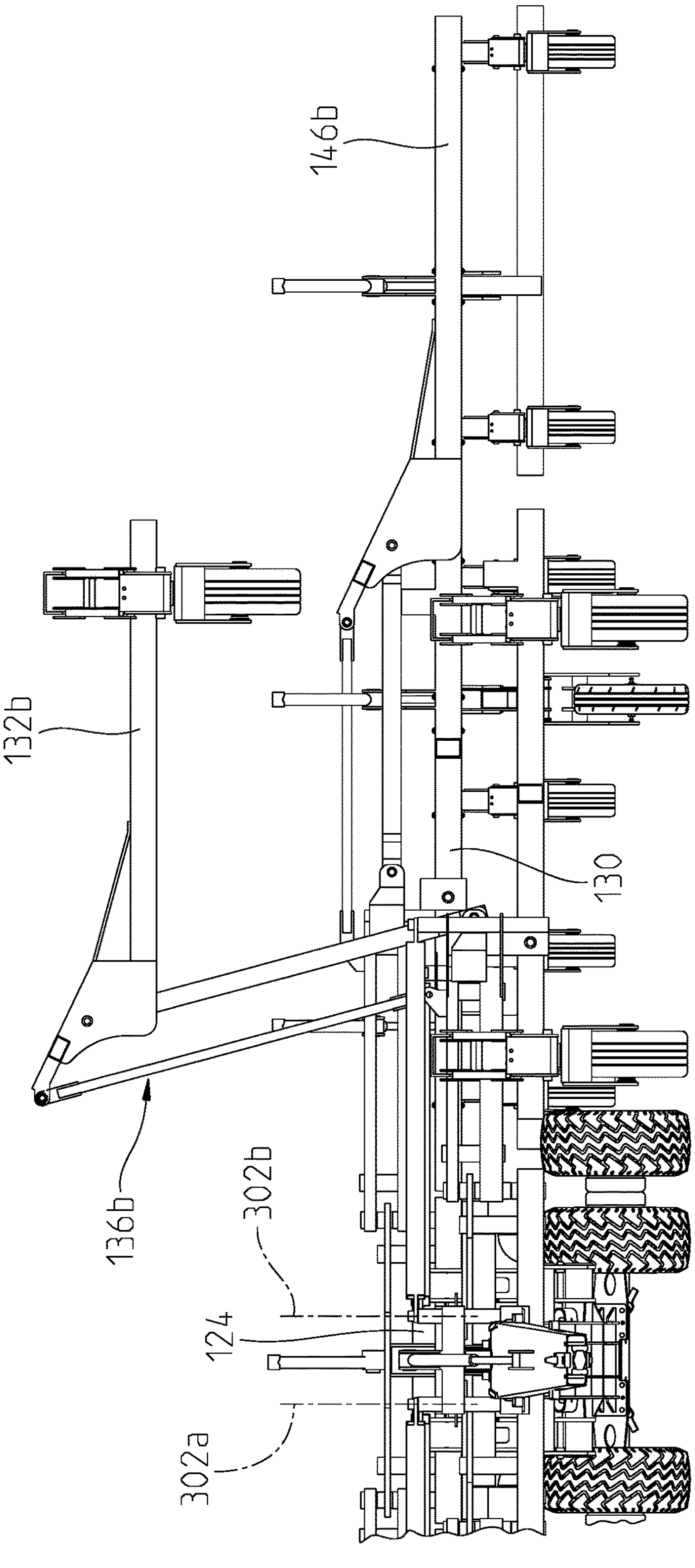
FIG. 2*b* is a detailed section view of the four-bar linkage assembly of FIG. 2*a* between the transport configuration and a stacked configuration.
Figure 3:
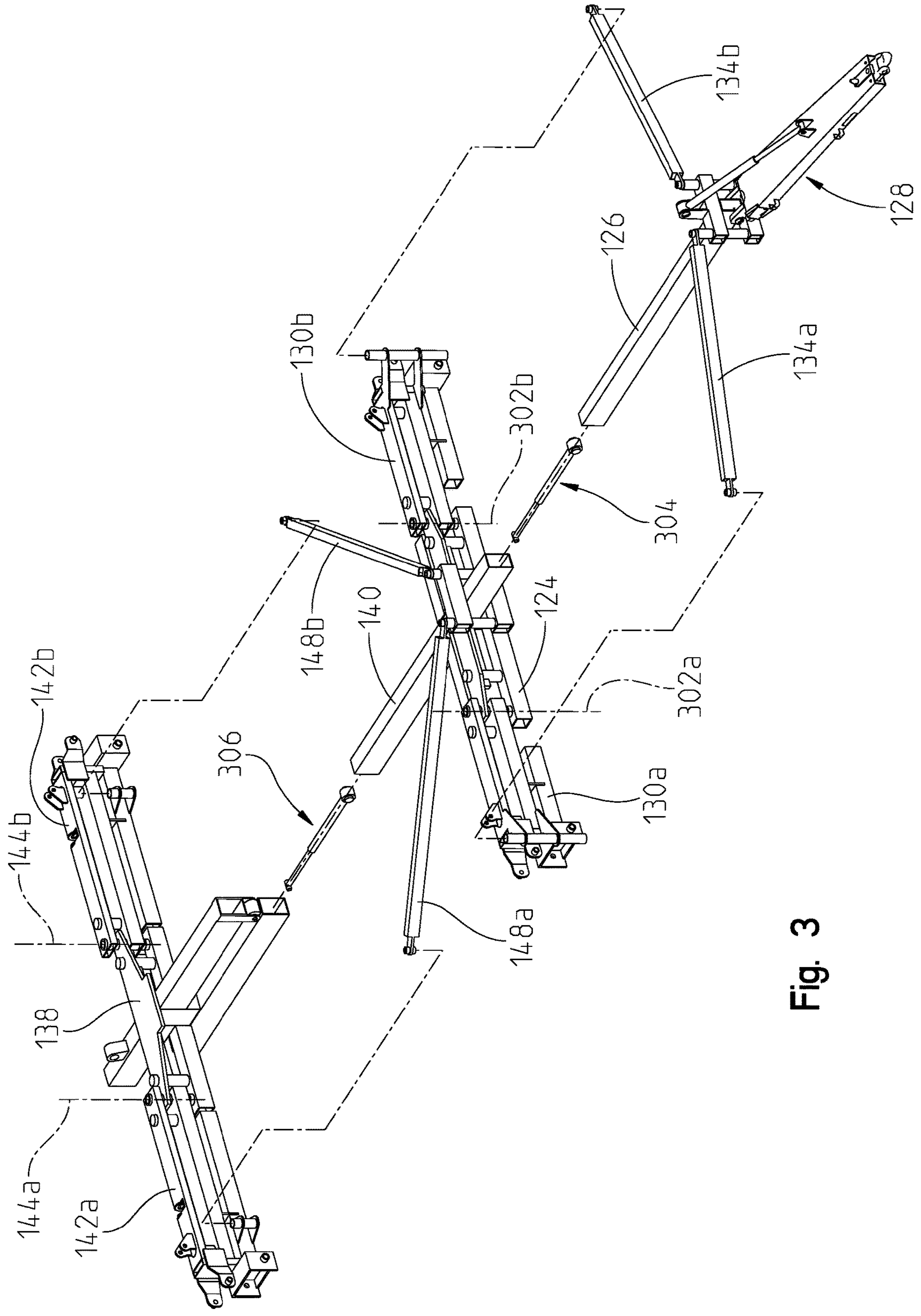
FIG. 3 is an elevated perspective expanded view a hitch assembly, frame, first center section, and second center section of the agricultural assembly of FIG. 1*a*.

Referring now to FIG. 2*b*, the first toolbar assembly 104 is illustrated with the forward wing extension 132*b* in the partially stacked configuration. As discussed herein the four-bar linkage assembly 136*b* allows the wing extension 132*b* to be positioned at least partially over the corresponding forward side wing 130*b*. FIG. 2*b* illustrates an intermediate location of the wing extension 132*b* as it transitions to the fully stacked configuration illustrated in FIGS. 6*a*, 6*b*. In one aspect of this disclosure, linear actuators may selectively transition the wing extensions 132*a*, 132*b* between the planting configuration and the fully stacked configuration. While FIG. 2*b* specifically illustrates the four-bar linkage assembly 136*b* and corresponding forward side wing 130*b* and wing extension 132*b*, a person skilled in the art understands how the teachings disclosed herein can be applied to any of the four-bar linkage assemblies (136*a*, 136*b*, 136*c*, 136*d*, 720*a*, 720*b*, 720*c*, 720*d*) disclosed herein and the detailed explanation for FIG. 2*b* is incorporated herein for the other four-bar linkage assemblies (136*a*, 136*b*, 136*c*, 136*d*, 720*a*, 720*b*, 720*c*, 720*d*) and corresponding side wings and extensions.

The second toolbar assembly 110 may have many similar components as the first toolbar assembly 104 and interact it many of the same ways. More specifically, the second toolbar assembly 110 may have a second center section 138 that is movable along a first sub frame 140 of the first center section 124. The second center section 138 may have a first rearward side wing 142*a* and a second rearward side wing 142*b* pivotally coupled thereto to pivot about second wing pivots 144*a*, 144*b*. Further, the first rearward side wing 142*a* may have a first rearward wing extension 146*a* coupled thereto via a third four-bar linkage 136*c*. Similarly, the second rearward side wing 142*b* may have a second rearward wing extension 146*b* coupled thereto via a fourth four-bar linkage 136*d*. The rearward wing extensions 146*a*, 146*b* may be movable through the four-bar linkages 136*c*, 136*d* between the planting configuration and a stacked configuration as discussed herein.

The second center section 138 may be selectively slidable along the sub frame 140 away from the hitch assembly 128 to transition the second toolbar assembly 110 to the transport configuration. More specifically, second links 148*a*, 148*b* may be pivotally coupled to the first center section 124 on one end and to corresponding rearward side wings 142*a*, 142*b* on the opposite end. In this configuration, as the second center section 138 slides along the sub frame 140 away from the first center section 124 the second links 148*a*, 148*b* engage the rearward side wings 142*a*, 142*b* to rotate the rearward side wings 142*a*, 142*b* and corresponding rearward wing extensions 146*a*, 146*b* inward towards the longitudinal axis 114.

In one aspect of this disclosure, the frame 126 may be positioned within a cavity of the sub frame 140 of the first center section 124. Similarly, the sub frame 140 may be positioned within a cavity of the second center section 138. In this configuration, the frame 126, sub frame 140, and second center section 138 may selectively slide telescopically relative to one another such that the first center section 124 may slid along the frame 126 without altering the location of the sub frame 140 and first center section 124 relative to the second center section 138. Further, the second center section 138 may be moved along the sub frame 140 without altering the location of the first center section 124 relative to the frame 126.

In one aspect of this disclosure, a first actuator 304 may be coupled to the frame 126 on one end and to the sub frame 140 on the other end such that linear displacement of the first actuator 304 cause the first center section 124 to slide along the frame 126. Similarly, a second actuator 306 may be coupled to the sub frame 140 on one end and to the second center section 308 on the other. In this configuration, the displacement of the second actuator 306 may be altered to slide the second center section 138 along the sub frame 140. The first and second actuators 304, 306 may be electric, hydraulic, pneumatic, or any other known linear actuator that can be selectively controlled.

Figure 5A:
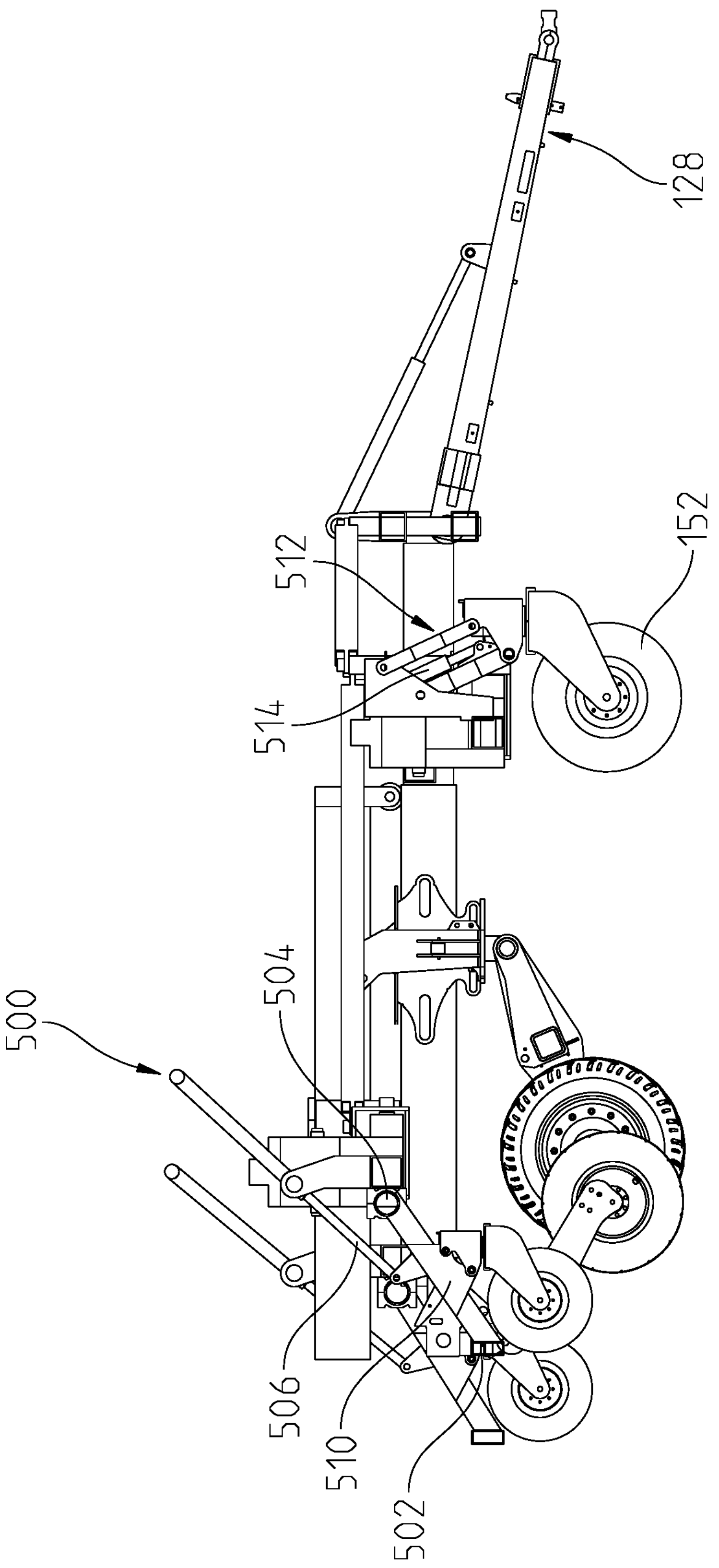
FIG. 5*a* is a section side view of a rockshaft assembly of the agricultural assembly of FIG. 1*a;*
Figure 5B:
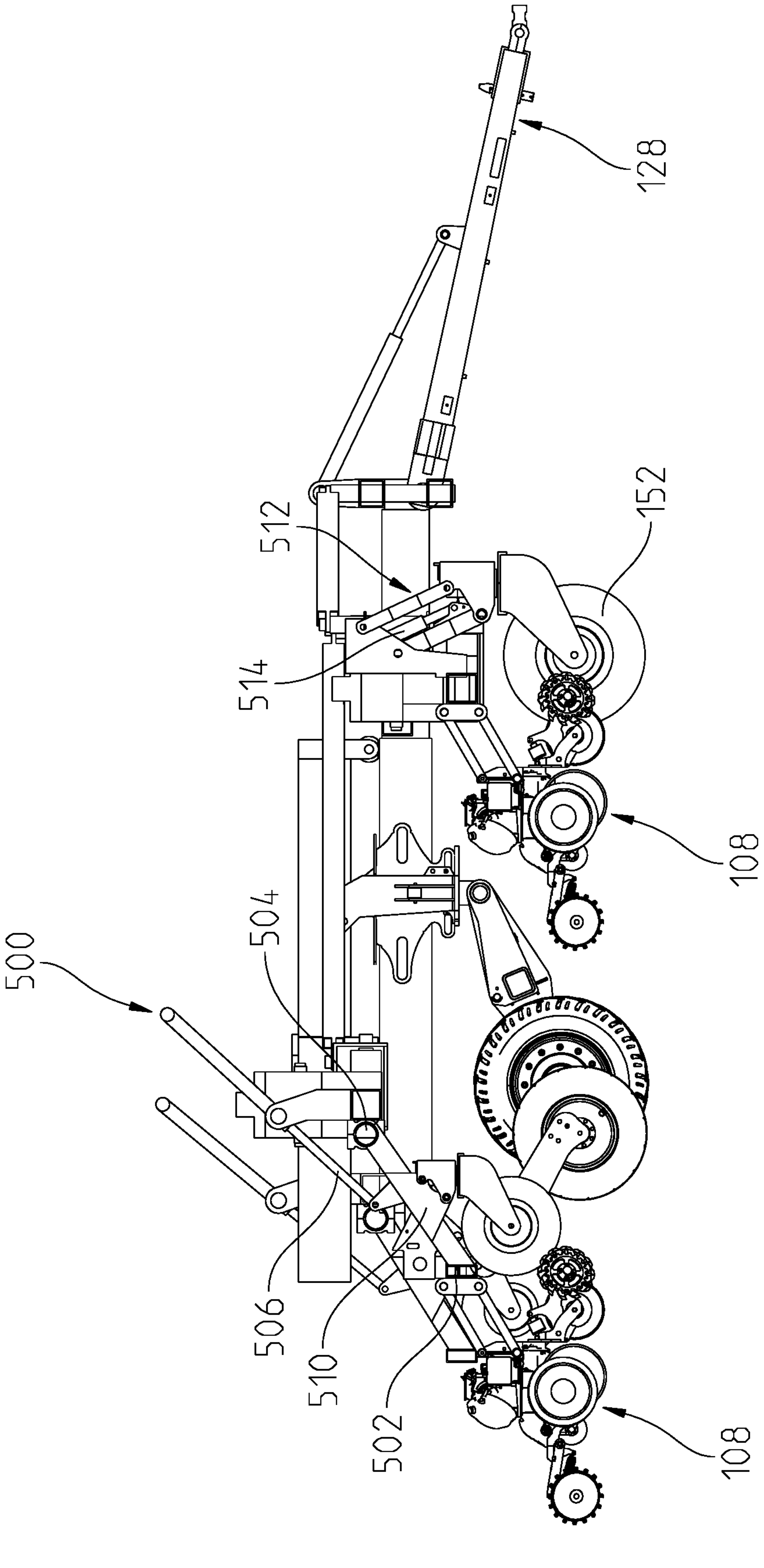
FIG. 5*b* is a section view of the rockshaft assembly of FIG. 5*a* with row units coupled thereto.

The second toolbar assembly 110 may have a pivotal toolbar assembly 500 configuration on each section (i.e., each rearward wing extension 146*a*, 146*b*, each rearward side wing 142*a*, 142*b*, and the second center section 138) as illustrated in FIG. 5*a*. More specifically, the row units 108 may be coupled to a pivotal toolbar 502 such that the row units may be selectively pivoted about a rockshaft 504 between a planting configuration, as illustrated in FIG. 5*a*, and an upright orientation as illustrated in FIG. 5*b*. More specifically, the rockshaft 504 may define an axis about which the pivotal toolbar 502 can pivot. In one example, a linear actuator 506 may be coupled to a support member 508 of the second toolbar assembly 110 on one end, and to a toolbar bracket 510 on the other end such that altering the length of the linear actuator 506 pivots the toolbar bracket 510 and pivotal toolbar 502 about the rockshaft 504. Each section of the second toolbar assembly 110 (i.e., each rearward wing extension 146*a*, 146*b*, each rearward side wing 142*a*, 142*b*, and the second center section 138) may have a similar pivotal toolbar 502, toolbar bracket 510, rockshaft 504, support member 508, and linear actuator 506 to selectively pivot row units 108 on each corresponding section about the corresponding rockshaft 504. Further, each section of the toolbar assembly 110 may be independently pivoted between the planting configuration and the upright configuration.

The pivotal toolbar 502 of the second toolbar assembly 110 may allow the row units to be selectively pivoted from the planting configuration to an at least partially vertical upright configuration. In the planting configuration, the pivotal toolbar 502 may be in the horizontal configuration wherein the row units coupled thereto can engage the underlying ground. However, as the agricultural machine 100 transitions to the transport configuration as discussed herein, the pivotal toolbar 502 may be pivoted to the upright configuration to provide for a smaller width of the agricultural assembly 100 in the transport configuration, among other reasons.

Figure 4A:
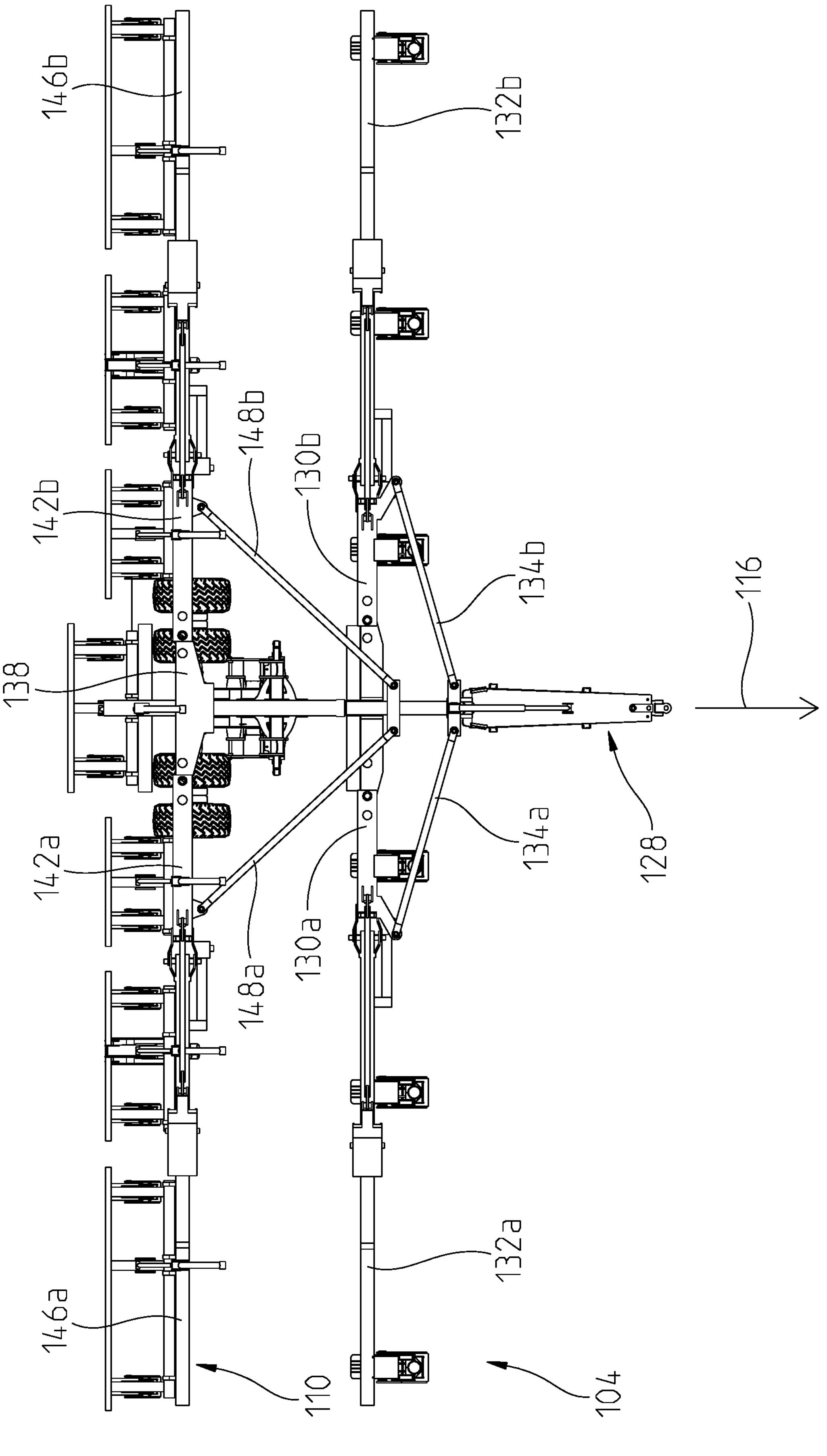
FIG. 4*a* is a top view of the agricultural assembly of FIG. 1*a* in the transport configuration.
Figure 4B:
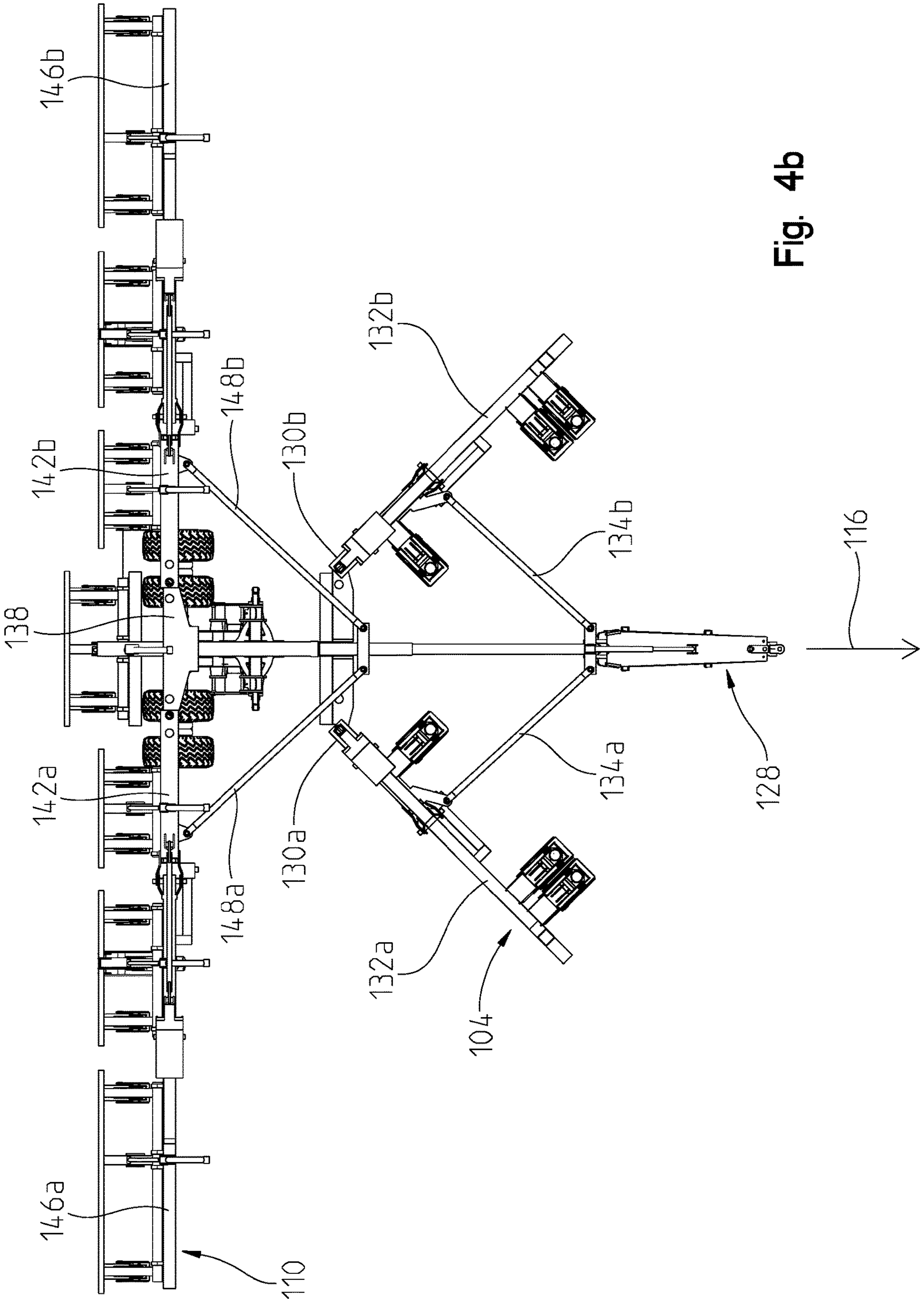
FIG. 4*b* is a top view of the agricultural assembly of FIG. 1*a* with a first toolbar assembly in a partially folded configuration.
Figure 4C:
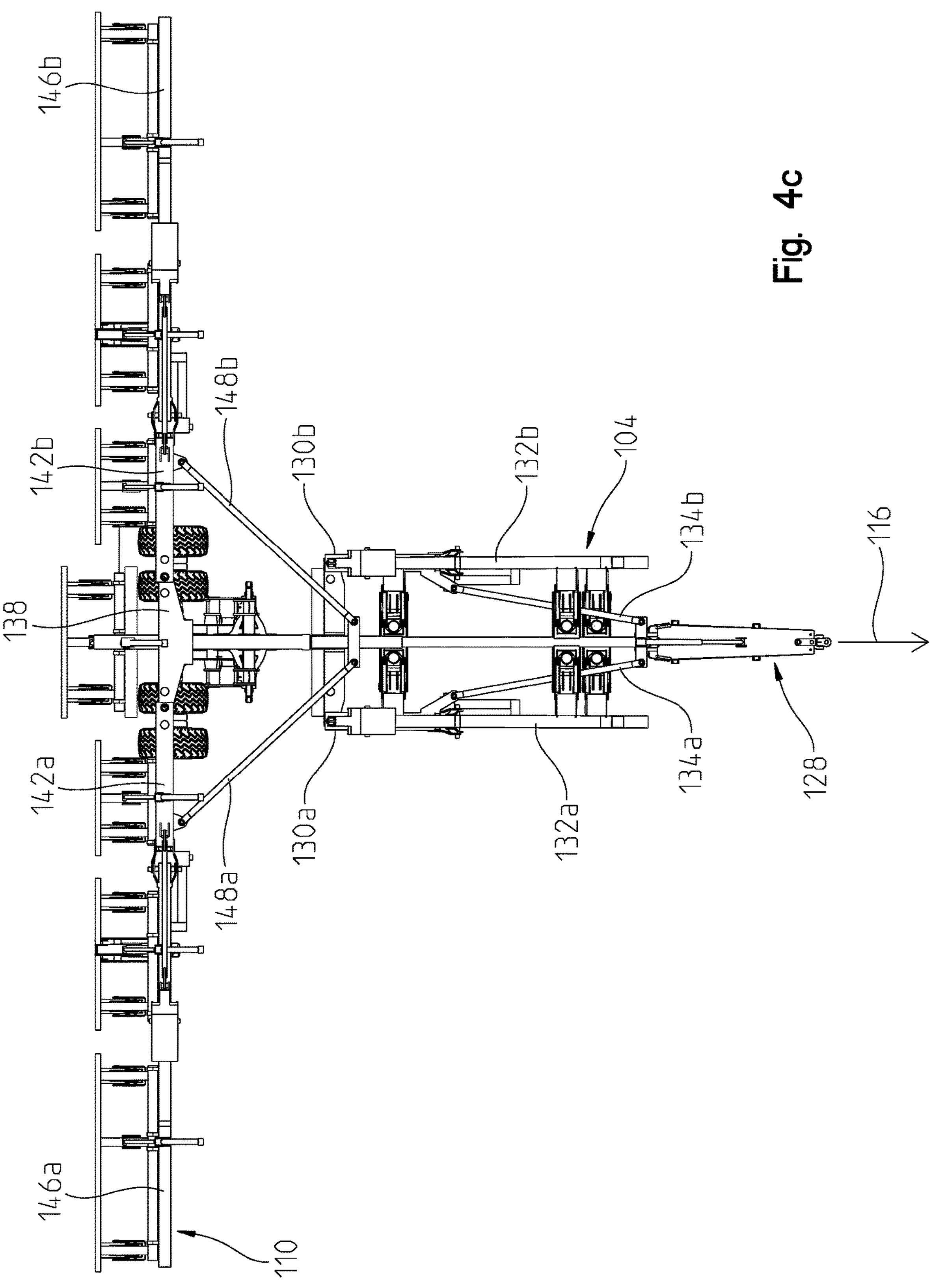
FIG. 4*c* is a top view of the agricultural assembly of FIG. 1*a* with the first toolbar assembly in a fully folded configuration.
Figure 4D:
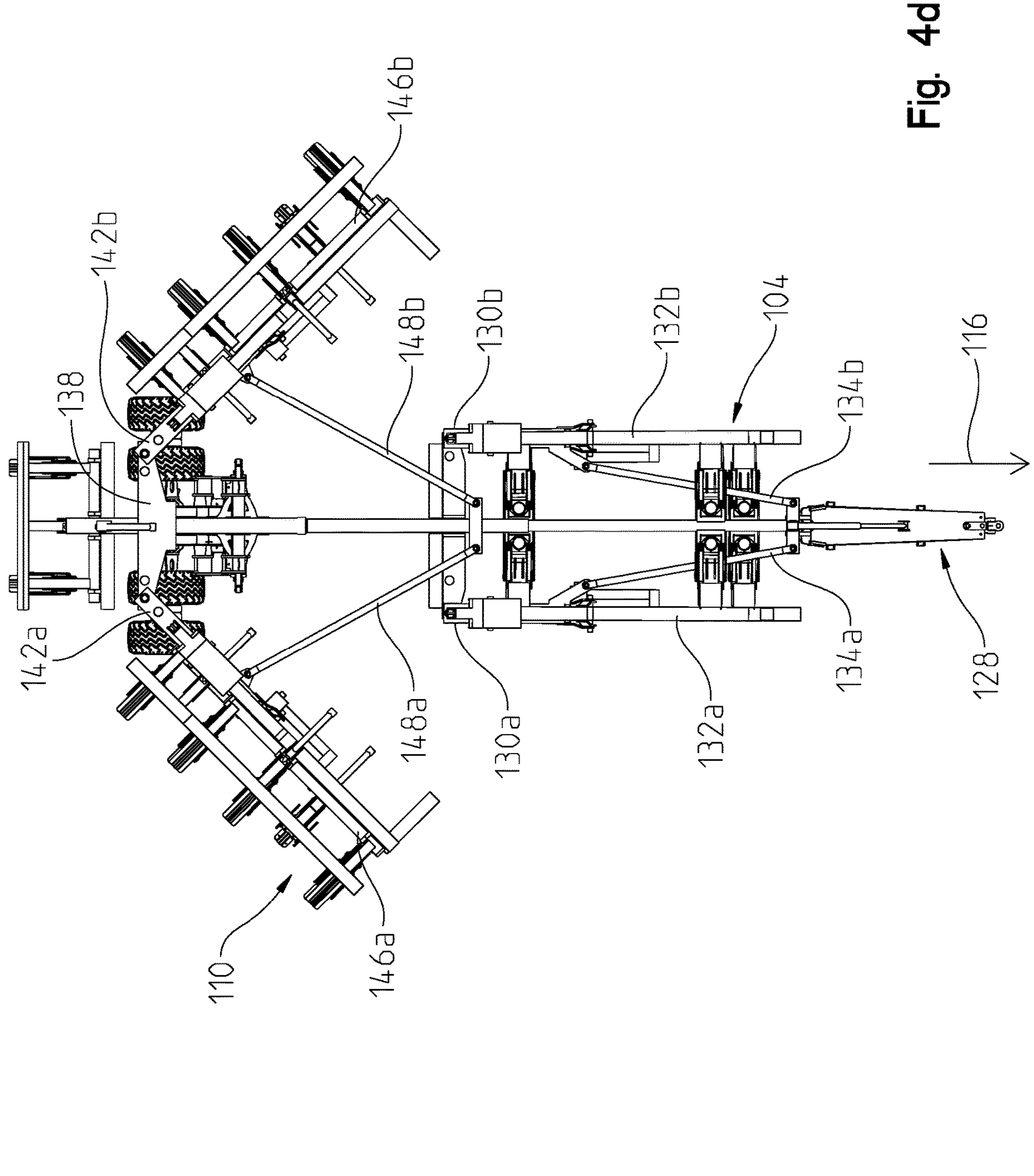
FIG. 4*d* is a top view of the agricultural assembly of FIG. 1*a* with a second toolbar assembly in a partially folded configuration.
Figure 4E:
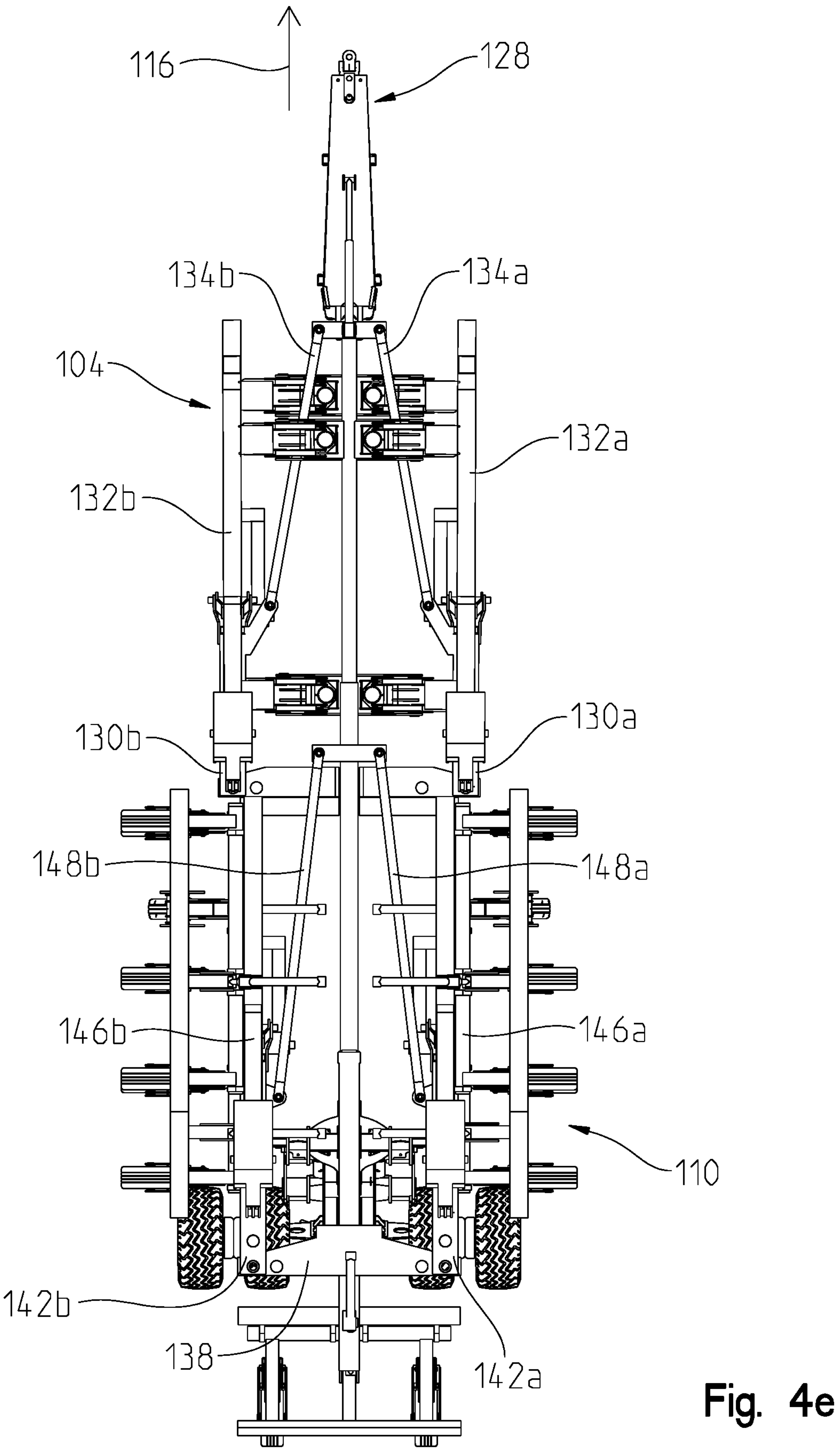
FIG. 4*e* is a top view of the agricultural assembly of FIG. 1*a* in a transport configuration.

Referring now to FIGS. 4*a*-4*e*, one example of several folded states of the agricultural assembly 100 is illustrated from a top perspective as the agricultural assembly 100 transitions between the planting configuration of FIG. 4*a* and the transport configuration of FIG. 4*e*. In FIG. 4*a*, both the first toolbar assembly 104 and the second toolbar assembly 110 are in the substantially extended orientation such that row units 108 coupled thereto can selectively deposit commodity in the underlying surface the entire width of the agricultural assembly 100. Before or while transitioning to the orientation of FIG. 4*b*, the forward wing extensions 132*a*, 132*b* may be transitioned to the stacked orientation via the corresponding four-bar linkages 136 and linear actuators. FIG. 4*b* illustrates a configuration wherein the forward wing extensions 132*a*, 132*b* are stacked and the first center section 124 is partially slid along the frame 126 away from the hitch assembly 128. In this configuration, the first links 134*a*, 134*b* engage and pivot the forward side wings 130*a*, 130*b* inwardly as the first center section 124 slides farther from the hitch assembly 128. In the configuration of FIG. 4*b*, the forward wing extensions 132*a*, 132*b* may be held in the stacked configuration via the corresponding four-bar linkages 136. In FIG. 4*c*, the front toolbar assembly 104 is in the fully front-folded position as the first center section 124 extends sufficiently far from the hitch assembly 128 such that the first links 134*a*, 134*b* pivot the forward side wings 130*a*, 130*b* to be positioned substantially adjacent too, and about parallel with, the frame 126.

The second toolbar assembly 110 may then be transitioned to the transport configuration. Similar to the first toolbar assembly 104, the second toolbar assembly may transition the rearward wing extensions 146*a*, 146*b* to the stacked configuration via the corresponding four-bar linkages 136 and linear actuators. The rearward wing extensions 146*a*, 146*b* may be transitioned to the stacked configuration either before, or while the second center section 138 is sliding away from the first center section 124. Regardless, FIG. 4*d* illustrates the second center section 138 moved along the sub frame 140 and partially spaced from the first center section 124 such that the second links 148*a*, 148*b* engage and pivot the rearward side wings 142*a*, 142*b* and corresponding rearward wing extensions 146*a*, 146*b* such that they begin to pivot inwardly towards the sub frame 140. As the second center section 138 is further spaced from the first center section 138, the second links 148*a*, 148*b* continue to engage the rearward side wings 142*a*, 142*b* until they are aligned substantially adjacent to, and substantially parallel with, the sub frame 140 as illustrated in FIG. 4*e*. See also FIGS. 6*a* and 6*b* for a perspective view and side view of the agricultural assembly 100 with the first and rearward wing extensions 132*a*, 132*b*, 146*a*, 146*b* in the stacked configuration and the first and second toolbar assemblies 104, 110 in the transport configuration illustrated in FIG. 4*e*.

In one example of this disclosure, the pivotal toolbar 502 of the second toolbar assembly 110 may be pivoted to the vertical configuration once the second toolbar assembly 110 is in the transport configuration illustrated in FIG. 4*e*. Alternatively, the pivotal toolbar 502 may be pivoted to the vertical configuration at any phase as the planter assembly 100 transitions from the planting configuration to the transport configuration. Further, while the second toolbar assembly 110 is described herein as having at least one pivotal toolbar assembly 500, in one embodiment contemplated by this disclosure the second toolbar assembly 110 does not have a pivotal toolbar assembly 500 at all and functions substantially similarly as the first toolbar assembly 104.

Figure 6C:
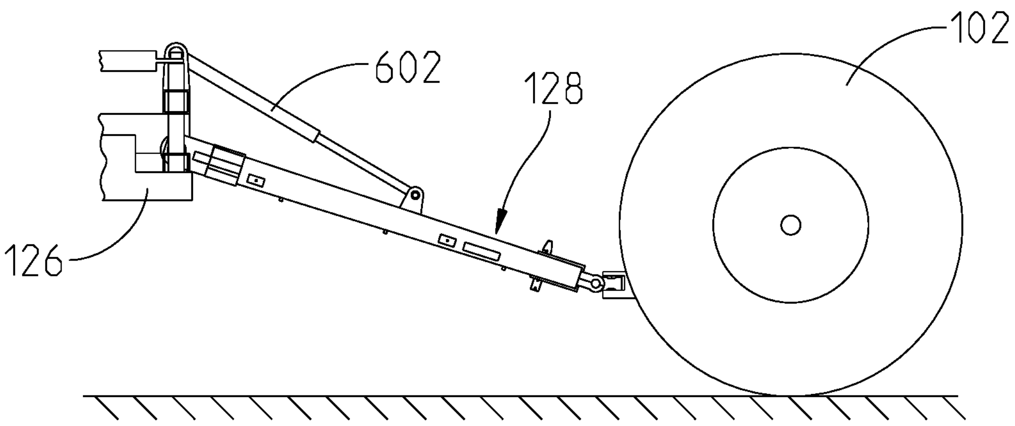
FIG. 6*c* is a detailed side view of a hitch assembly of the agricultural assembly of FIG. 1*a* in a raised configuration.
Figure 6D:
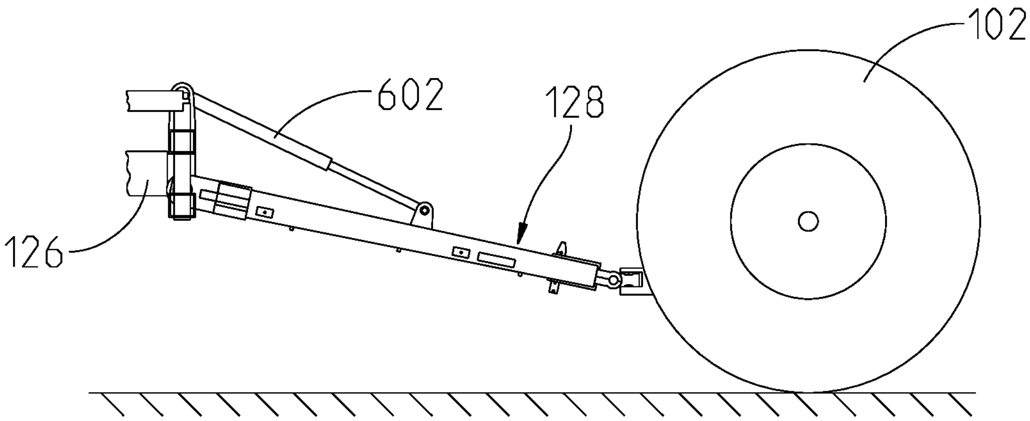
FIG. 6*d* is a detailed side view of a hitch assembly of the agricultural assembly of FIG. 1*a* in a partially raised configuration.
Figure 6E:
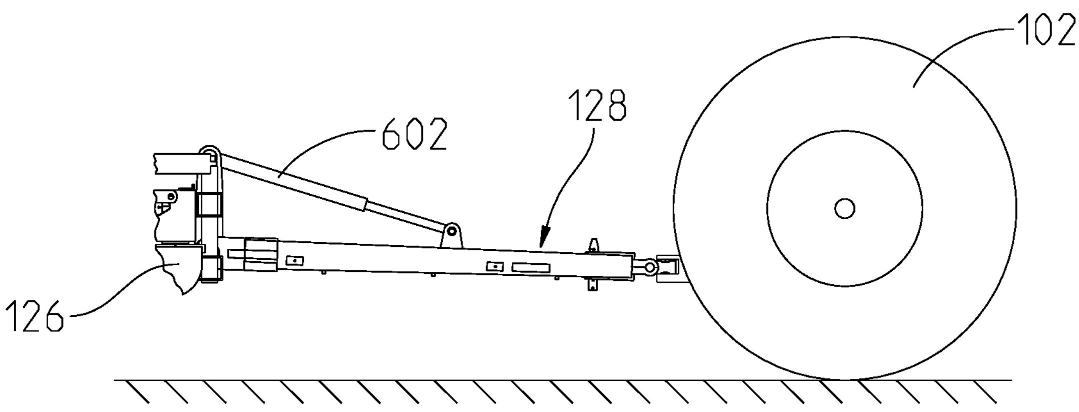
FIG. 6*e* is a detailed side view of a hitch assembly of the agricultural assembly of FIG. 1*a* in a lowered configuration.

In another aspect of this disclosure, the hitch assembly 128 may be pivotally coupled to the frame 126 such that a hitch actuator 602 may selectively alter the angle between the hitch 128 and the frame 126. One or more wheel actuator 604 may also be coupled between the second center section 138 and the corresponding primary wheel 150 to selectively alter distance of the primary wheel 150 from the second center section 138. In this embodiment, the hitch actuator 602 may be altered along with the one or more wheel actuator 604 to space the first and second toolbar assemblies 104, 110 farther from the underlying surface in the transport configuration. Raising the first and second toolbar assemblies 104, 110 may ensure the corresponding caster wheels 152 do not contact the underlying surface in the transport configuration. For example, in FIG. 6*c* the hitch assembly 128 may be maintained in the raised position via the hitch actuator 602. In FIG. 6*d* the hitch actuator 602 transitioned the hitch assembly 128 and frame 126 to an intermediate position. In FIG. 6*e* the hitch actuator 602 transitioned the hitch assembly 128 and frame 126 to the planting configuration. In each configuration of the hitch assembly 128, the wheel actuator 604 may be similarly manipulated to ensure the frame 126 remains substantially level as it is raised or lowered relative to the underlying surface.

Further, each of the caster wheels 152 may have a four-bar coupling configuration 512 coupling them to the corresponding portion of the first or second toolbar assembly 104, 110. In this configuration, the caster wheels 152 can transition between an extended position wherein they contact the underlying surface and a retracted position wherein an actuator 514 withdraws the caster wheel 152 from the underlying ground through an interconnection within the four-bar coupling configuration 512.

Figure 7A:
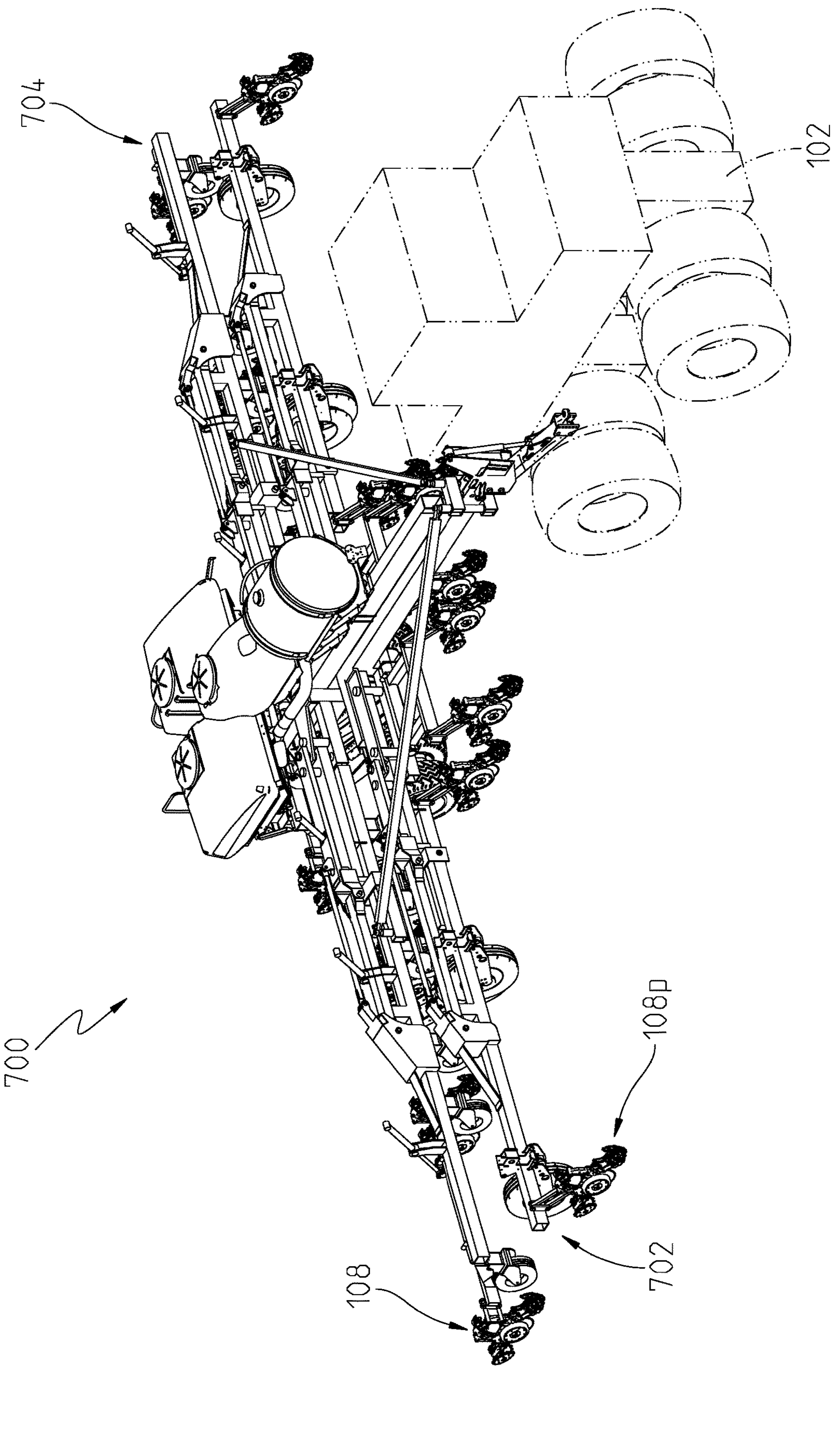
FIG. 7*a* is an elevated perspective view of another embodiment of an agricultural assembly coupled to a work machine.
Figure 7B:
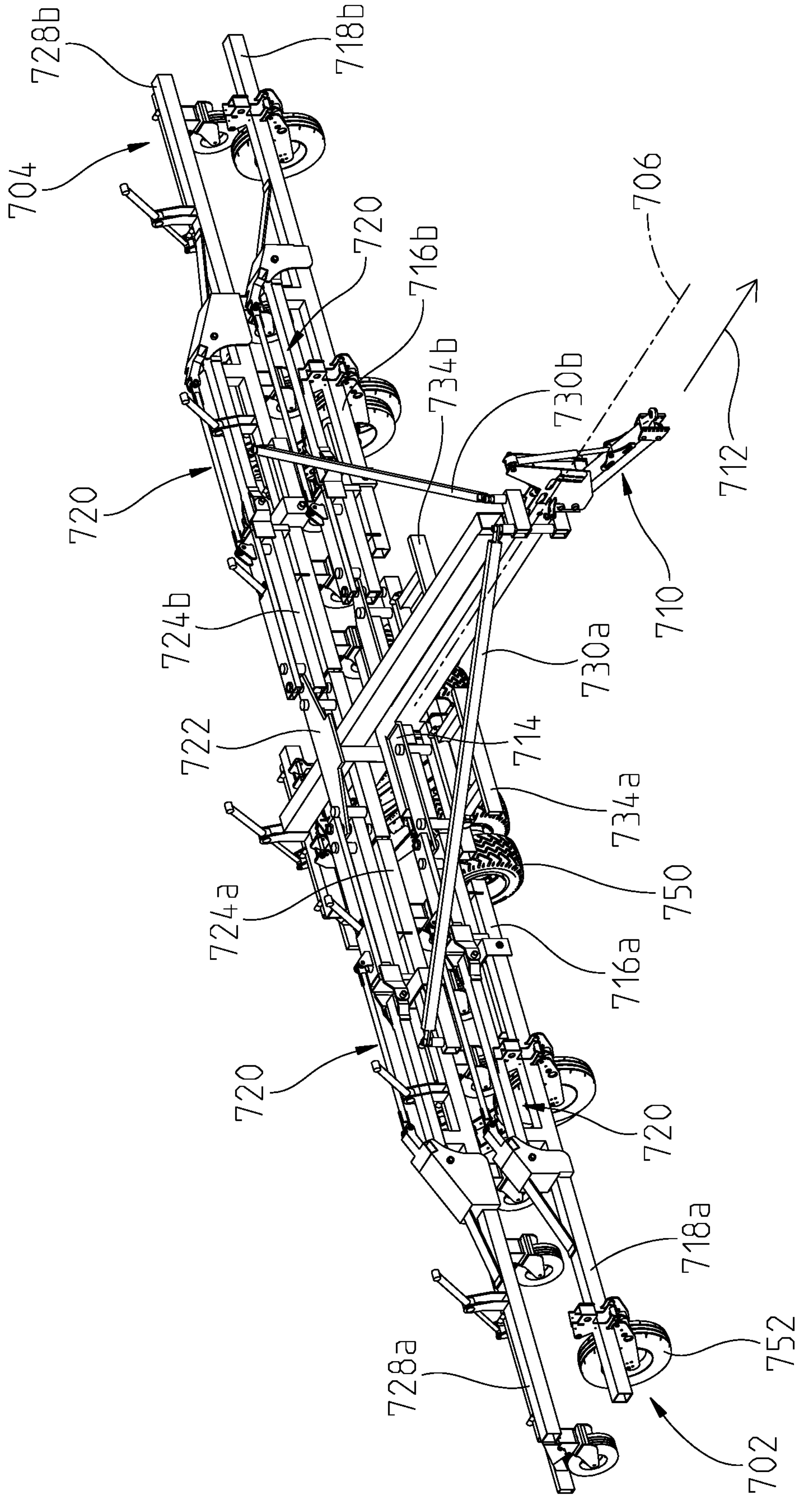
FIG. 7*b* is an elevated perspective view of the agricultural assembly of FIG. 7*a;*
Figure 8:
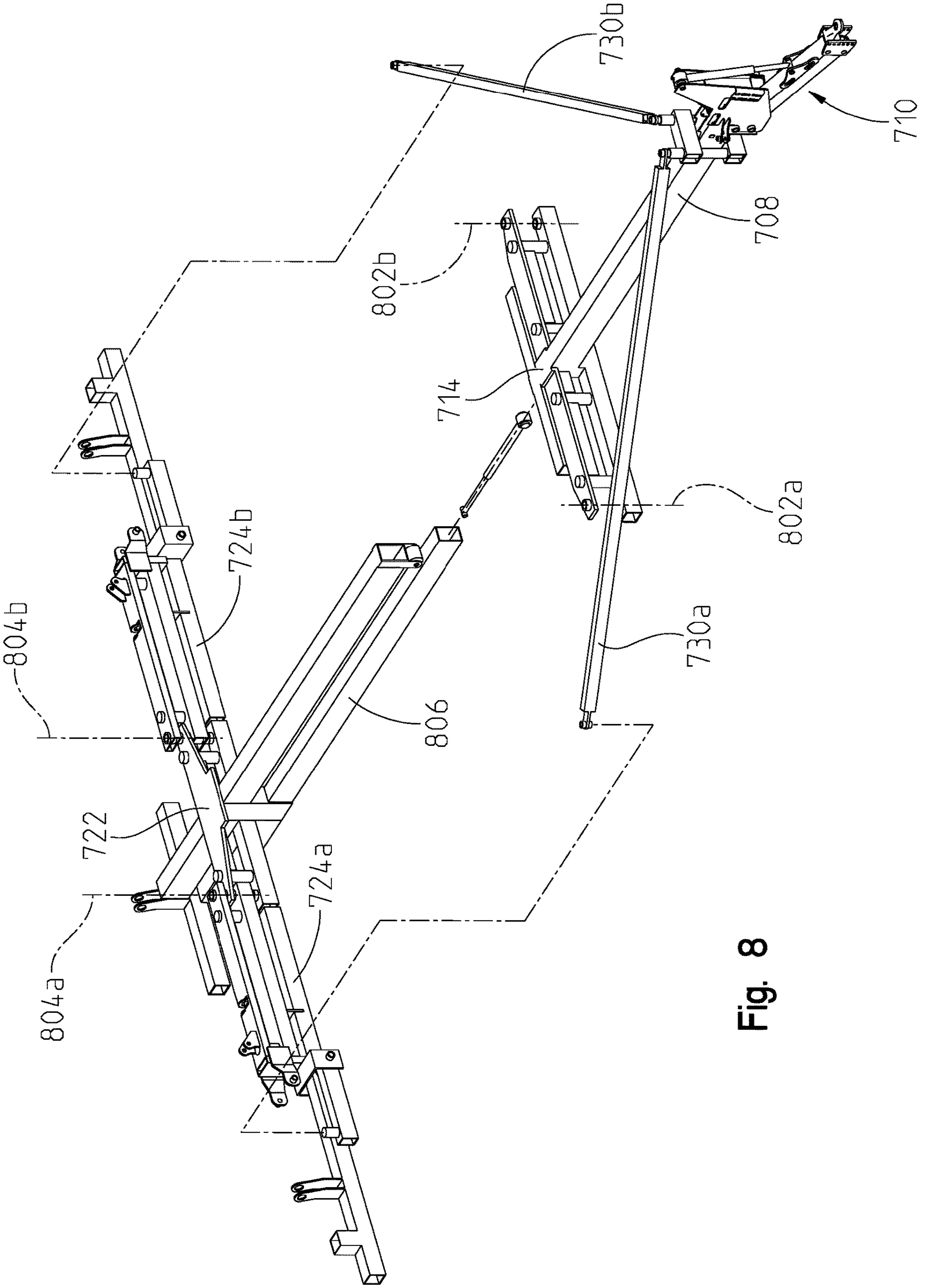
FIG. 8 is an elevated perspective expanded view a hitch assembly, frame, first center section, and second center section of the agricultural assembly of FIG. 7*a;*

Referring now to FIGS. 7*a*-7*b*, another embodiment of an agricultural assembly 700 is illustrated. In this embodiment, the agricultural assembly 700 has a first toolbar assembly 702 and a second toolbar assembly 704 configured to be towed behind a work machine 102 similarly to the agricultural assembly 100 discussed herein. The agricultural assembly 700 has a planting configuration as illustrated in FIGS. 7*a* and 7*b* wherein the first toolbar assembly 702 and second toolbar assembly 704 extend substantially perpendicularly from a longitudinal axis 706 to provide for mounting of a plurality of row units 108. As discussed herein, the row units 108 are configured to selectively distribute a commodity into the underlying surface. Further, the row units 108*p* on the first toolbar assembly 702 and the row units 108 on the second toolbar assembly 704 may be spaced to distribute commodity in every other row across the width of the agricultural assembly 700. As discussed herein with reference to the agricultural assembly 100, this configuration of row unit spacing between the first and second toolbars 702, 704 allows the agricultural machine 700 to distribute commodity in closely spaced rows among other things.

The first toolbar 702 of the agricultural assembly 700 may be configured to accommodate push-style row units 108*p*. Push-style row units 108*p* may be row units that utilize a toolbar behind the row unit relative to the intended direction of travel such that the toolbar pushes the row unit in the desired direction. The second toolbar assembly 704 may be configured to accommodate the pull-style row units 108 described herein with reference to the agricultural assembly 100.

The agricultural assembly 700 has a frame 708 coupled to a hitch assembly 710 to selectively couple the agricultural assembly 700 to a work machine 102. Further, the agricultural assembly 700 may be movable between the transport configuration illustrated in FIGS. 7a-7b and a transport configuration illustrated in FIGS. 9g-9h and FIG. 10a. More specifically, both the first toolbar assembly 702 and the second toolbar assembly 704 may front-fold in the intended direction of travel 712 towards the hitch assembly 710 as they transition from the planting configuration to the transport configuration.

The first toolbar assembly 702 may comprise a first center section 714 with a first forward side wing 716a pivotally coupled thereto on one side and a second forward side wing 716b pivotally coupled to the first center section 714 on another side relative to the longitudinal axis 706. Further, each forward side wing 716a, 716b may have a first forward wing extension 718a and a second forward wing extension 718b, respectively, coupled thereto through a four-bar linkage 720. The first center section 714 may be substantially rigidly coupled to the frame 710. In this configuration, the first center section 714 does not substantially move relative to the frame 708. However, the forward side wings 716a, 716b are pivotal inwardly relative to the center section 714 towards the hitch assembly 710 to become oriented in the transport configuration. Further still, the forward wing extensions 718a, 718b are movable to a stacked position over the corresponding forward side wings 716a, 716b as described herein with reference to the four-bar linkage 136 of the agricultural assembly 100.

The first toolbar assembly 702 may also have a first and second pivotal toolbar assembly 734a, 234b across the first center section 714. The pivotal toolbar assemblies 734 may comprise a rockshaft that is selectively pivotal relative to a support member via a linear actuator similar to that described with reference to the pivotal toolbar assembly 500 of FIG. 5. The first pivotal toolbar assembly 734a may be positioned along the first center section 714 on a first side relative to the frame 708 and the second pivotal toolbar assembly 734b may be positioned on a second side relative to the frame 708. The first and second pivotal toolbar assemblies 734a, 234b are sized to selectively raise any row units 108p coupled thereto to an at least partially vertical position to allow for the forward side wings 716a, 716b to become positioned in the transport configuration without contacting the row units 108p of the first and second pivotal toolbar assemblies 734a, 234b.

In this configuration, the forward wing extensions 718a, 718b are movable to the stacked configuration above the corresponding first side wing 716a, 716b. Further, the forward side wings 716a, 716b are pivotal about first wing pivots 802a, 802b defined by the first frame section 714 inwardly towards the transport configuration. In use, the forward wing extensions 718a, 718b may be transitioned above the corresponding forward side wing 716a, 716b to the transport configuration and then the forward side wings 716a, 716b may be pivoted forward to the transport configuration while the forward wing extensions 718a, 718b are in the stacked configuration. The forward wing extensions 718a, 718b may be transitioned to the stacked configuration either before the forward side wings 716a, 716b begin to pivot or while the forward side wings 716a, 716b are pivoting to the transport configuration.

In one aspect of this disclosure, each first side wing 716a, 716b may each have a linear actuator 760a, 760b or other mechanism coupled thereto to selectively pivot the corresponding first side wing 716a, 716b between the transport and planting configuration. In one example, the linear actuators 760a, 760b are hydraulic cylinders coupled to the frame 708 on one end and to a corresponding one of the forward side wings 716a, 716b on the other end. As the length of the hydraulic cylinder is altered, the corresponding first side wing 716a, 716b may pivot about the first wing pivot 802 of the first center section 714.

The second toolbar assembly 704 may be functionally similar to the second toolbar assembly 110 of the agricultural assembly 100 and much of the description of the second toolbar assembly 110 is applicable here as well. More specifically, the second toolbar assembly 704 has a second center section 722 that is slidably mounted to the frame 708. The second center section 722 may have rearward side wings 724a, 724b pivotally coupled thereto about corresponding rearward wing pivots 804a, 804b. Further, rearward wing extensions 728a, 728b are movably coupled to the corresponding rearward side wings 724a, 724b via respective four-bar linkages 720. Accordingly, the rearward side wings 724a, 724b are movable via the four-bar linkages 720 to a stacked configuration similar to the forward wing extensions 718a, 718b and as described in detail with reference to the agricultural assembly 100 in FIGS. 2a and 2b.

Linkages 730a, 730b are pivotally coupled to the frame 708 on one end and to a corresponding rearward side wing 724a, 724b on the other end. In this configuration, as the second center section 720 slides away from the first center section 714 along the longitudinal axis 706, the linkages 730a, 730b engage the corresponding rearward side wings 724a, 724b to pivot them inwardly along with the rearward wing extensions 728a, 728b. The second center section 720 may slide sufficiently away from the first center section 714 so that the linkages 730a, 730b pivot the rearward side wings 724a, 724b, and corresponding rearward wing extensions 728a, 728b inwardly to the transport configuration.

Figure 5C:
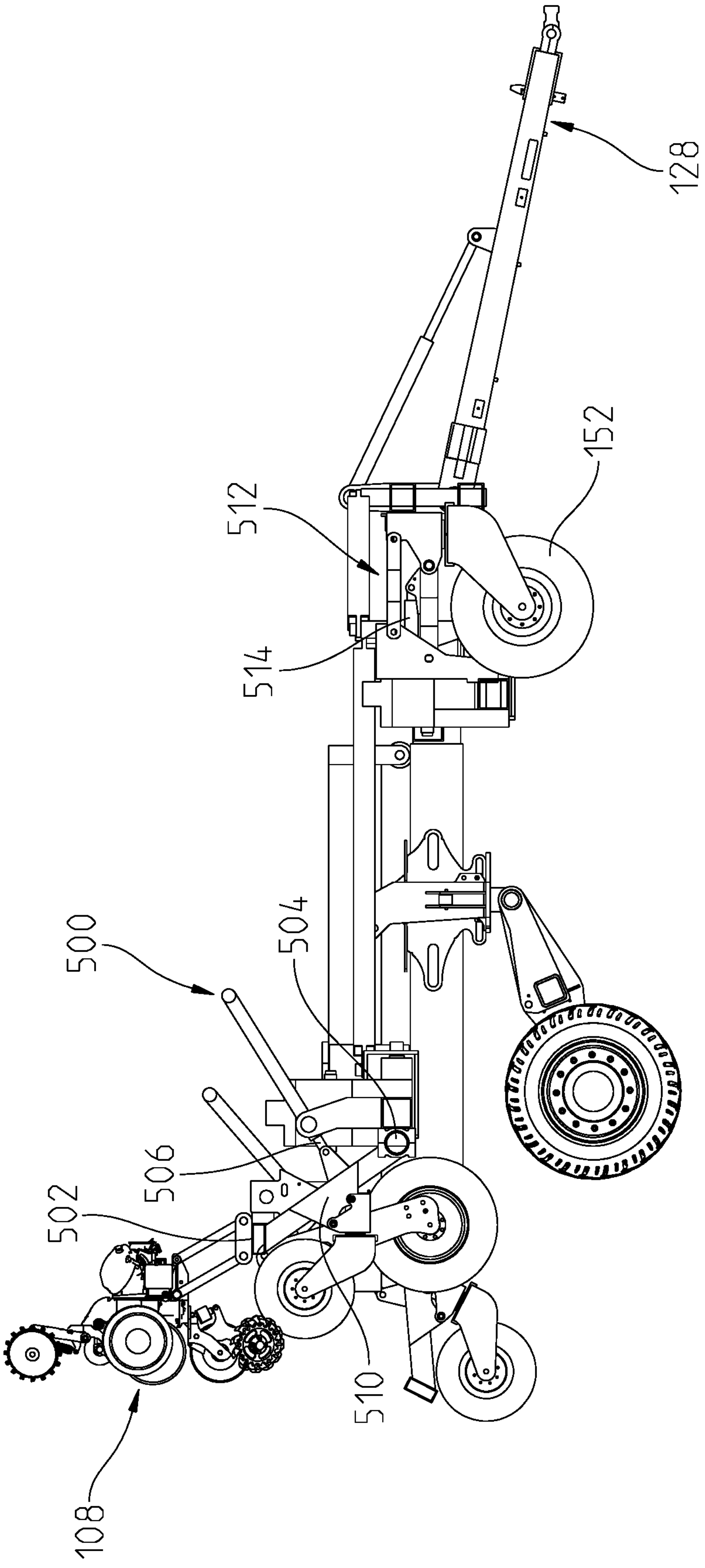
FIG. 5*c* is a section view of the rockshaft assembly of FIG. 5*b* with the row units in a raised configuration.

The second toolbar assembly 704 may also have a plurality of pivotal toolbar assemblies 500 as discussed herein with reference to FIG. 5. The pivotal toolbar assemblies 500 of the second toolbar assembly 704 may provide toolbar sections along the second toolbar assembly 704 that can selectively pivot any row units coupled thereto from a horizontal planting configuration to an at least partially vertical transport position.

Figure 9A:
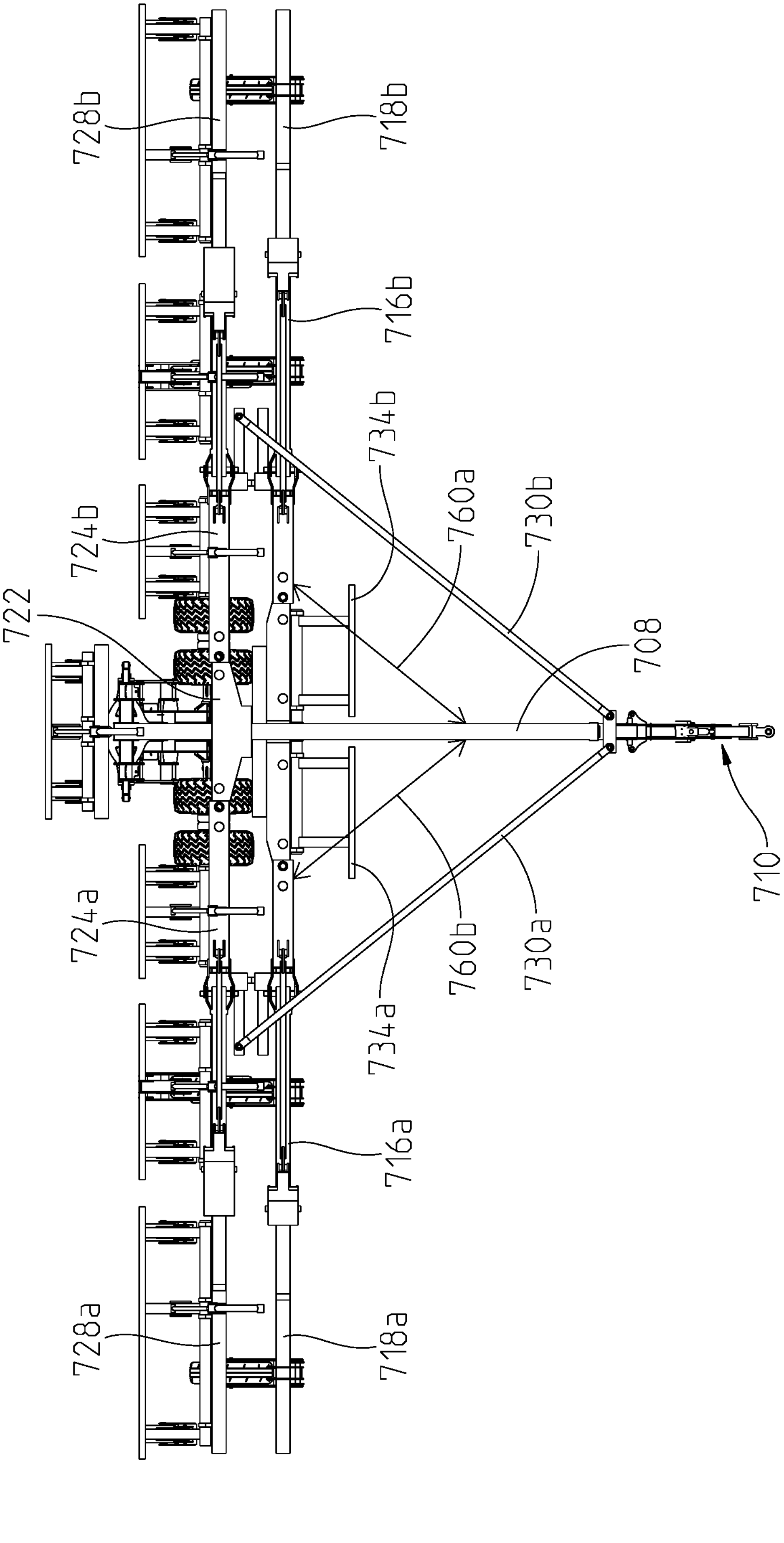
FIG. 9*a* is a top view of the agricultural assembly of FIG. 7*a* in the planting configuration.
Figure 9B:
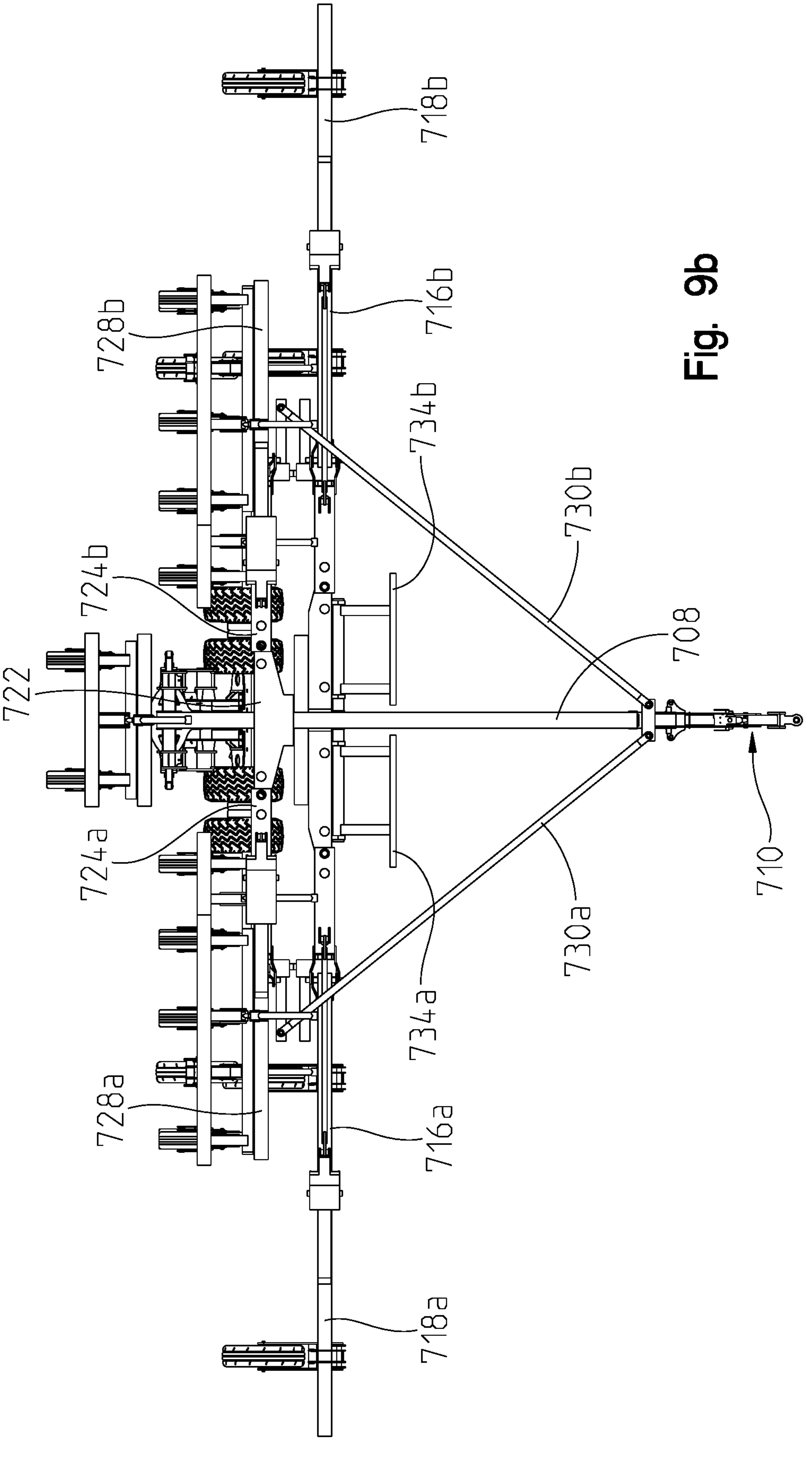
FIG. 9*b* is a top view of the agricultural assembly of FIG. 7*a* with a second toolbar assembly with extensions in a stacked configuration.
Figure 9C:
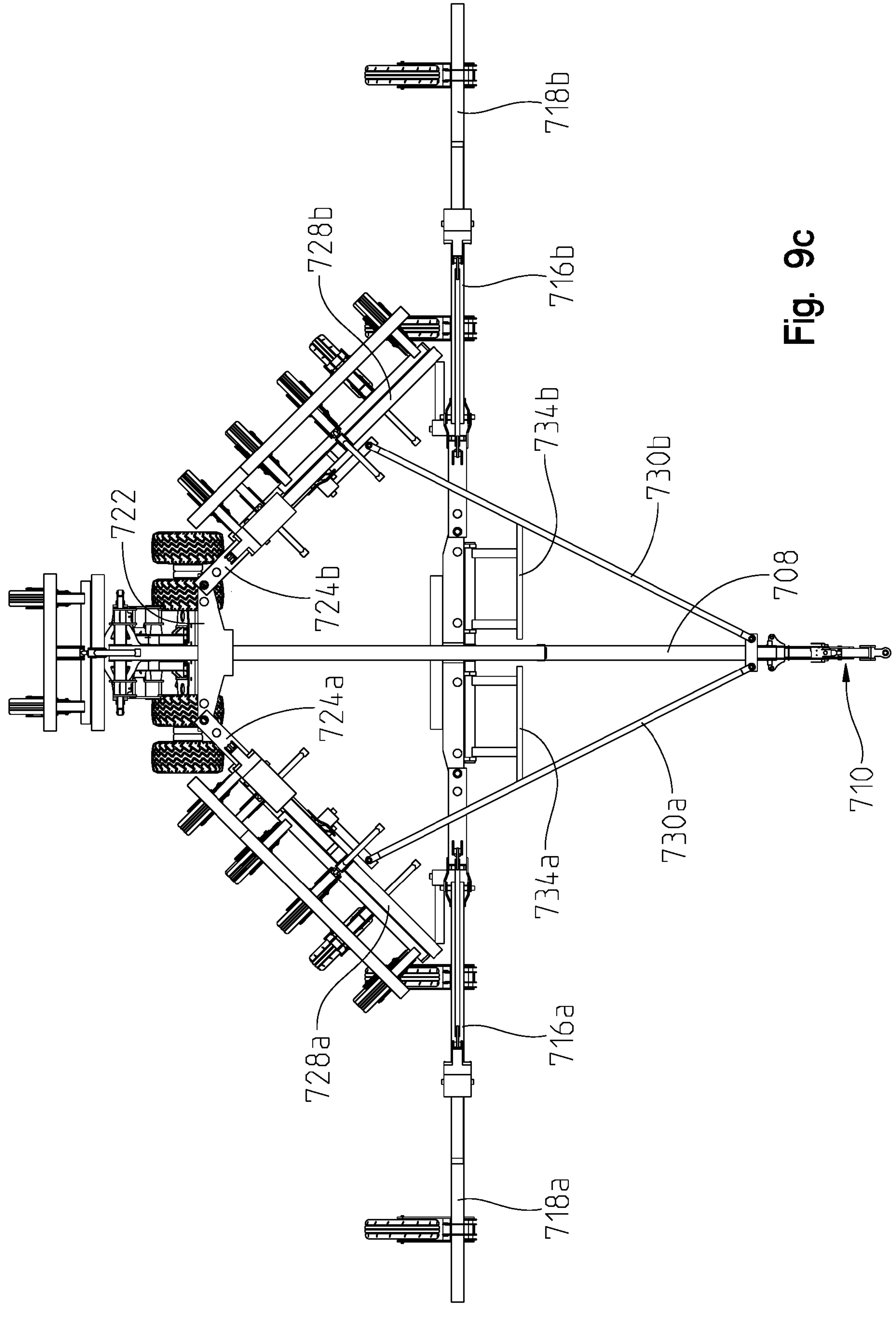
FIG. 9*c* is a top view of the agricultural assembly of FIG. 7*a* with the second toolbar assembly in the partially folded configuration.
Figure 9D:
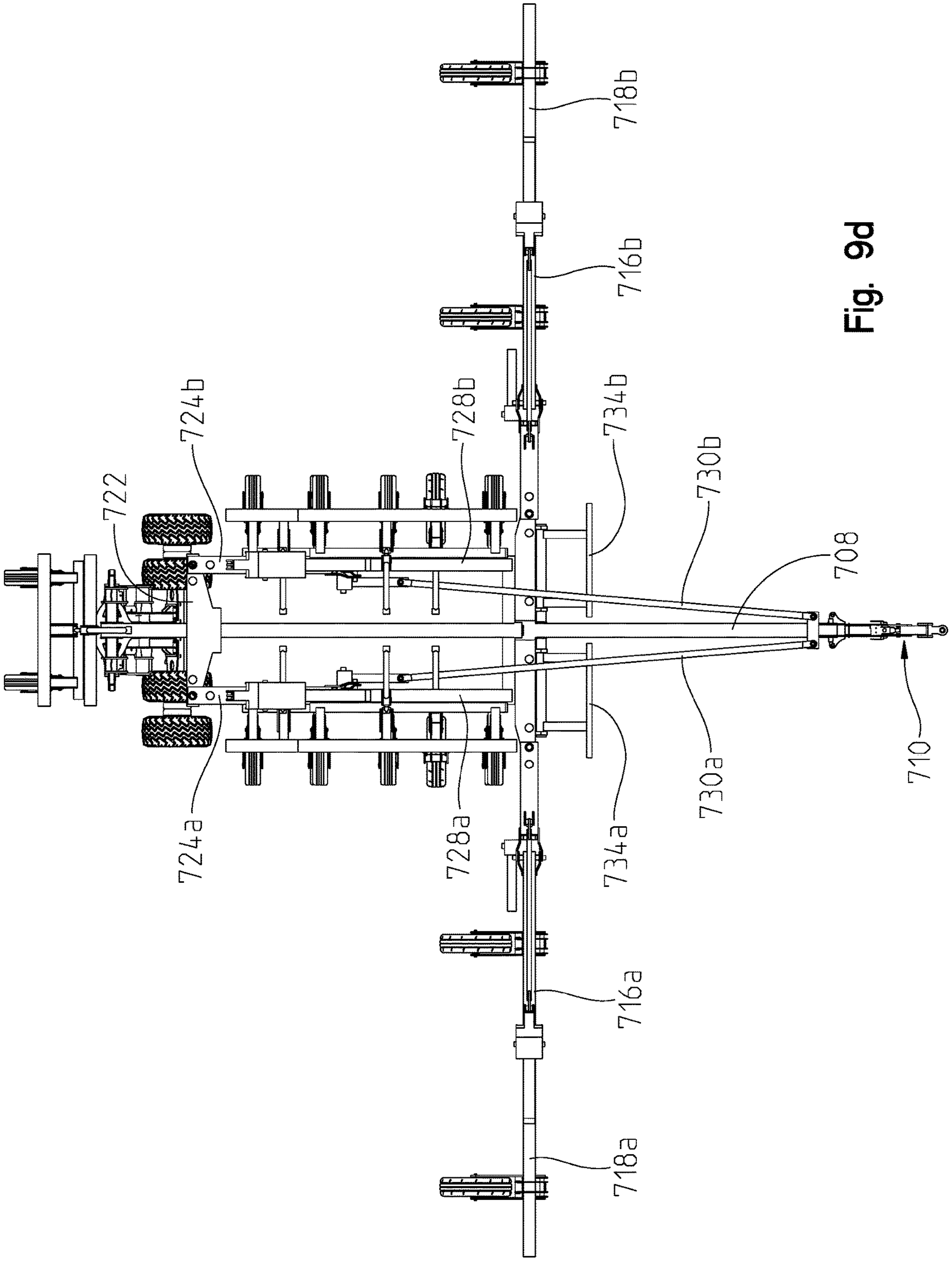
FIG. 9*d* is a top view of the agricultural assembly of FIG. 7*a* with the second toolbar assembly in a fully folded configuration.
Figure 9E:
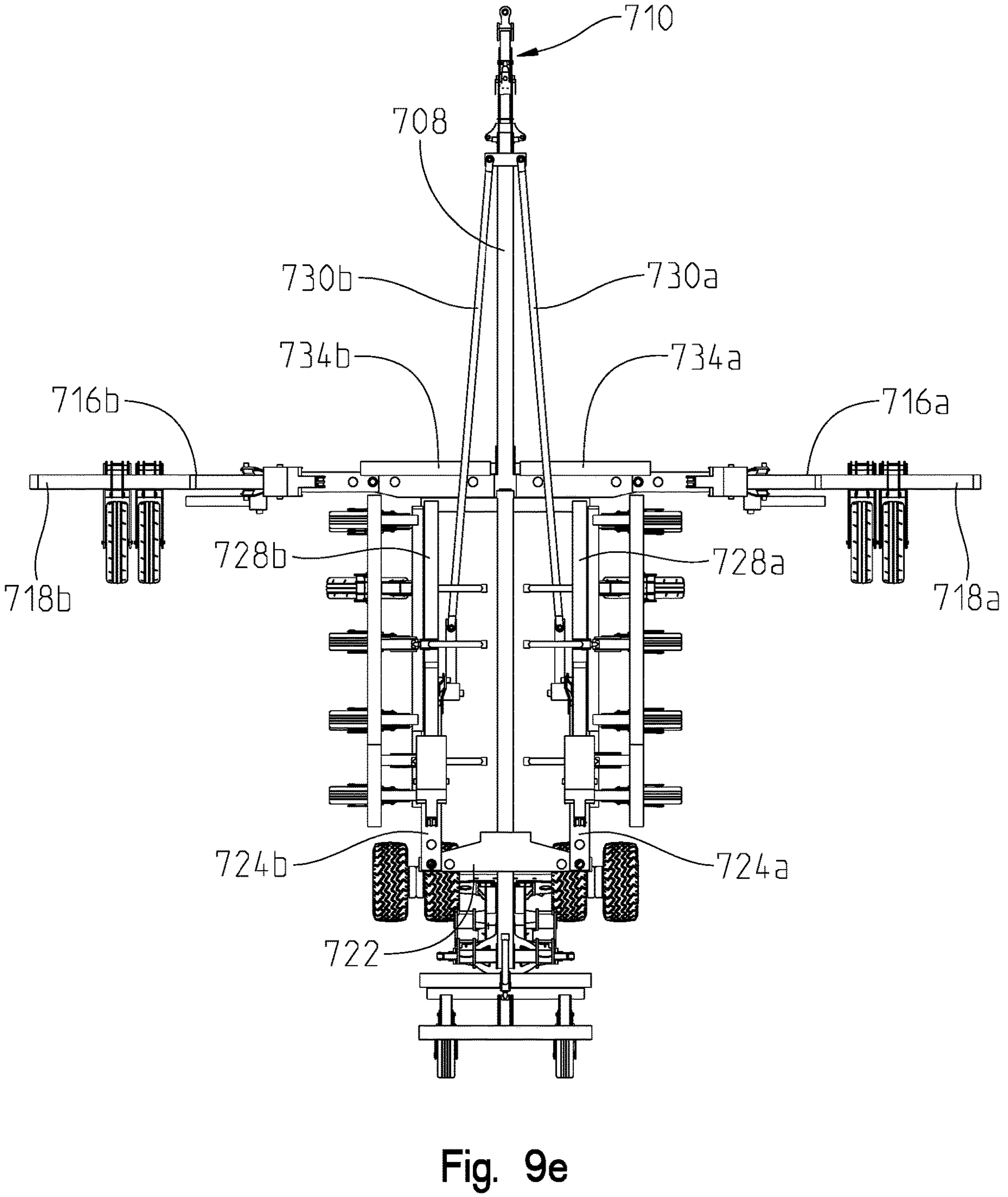
FIG. 9*e* is a top view of the agricultural assembly of FIG. 7*a* with a first tool bar assembly having extensions in a stacked configuration.
Figure 9F:
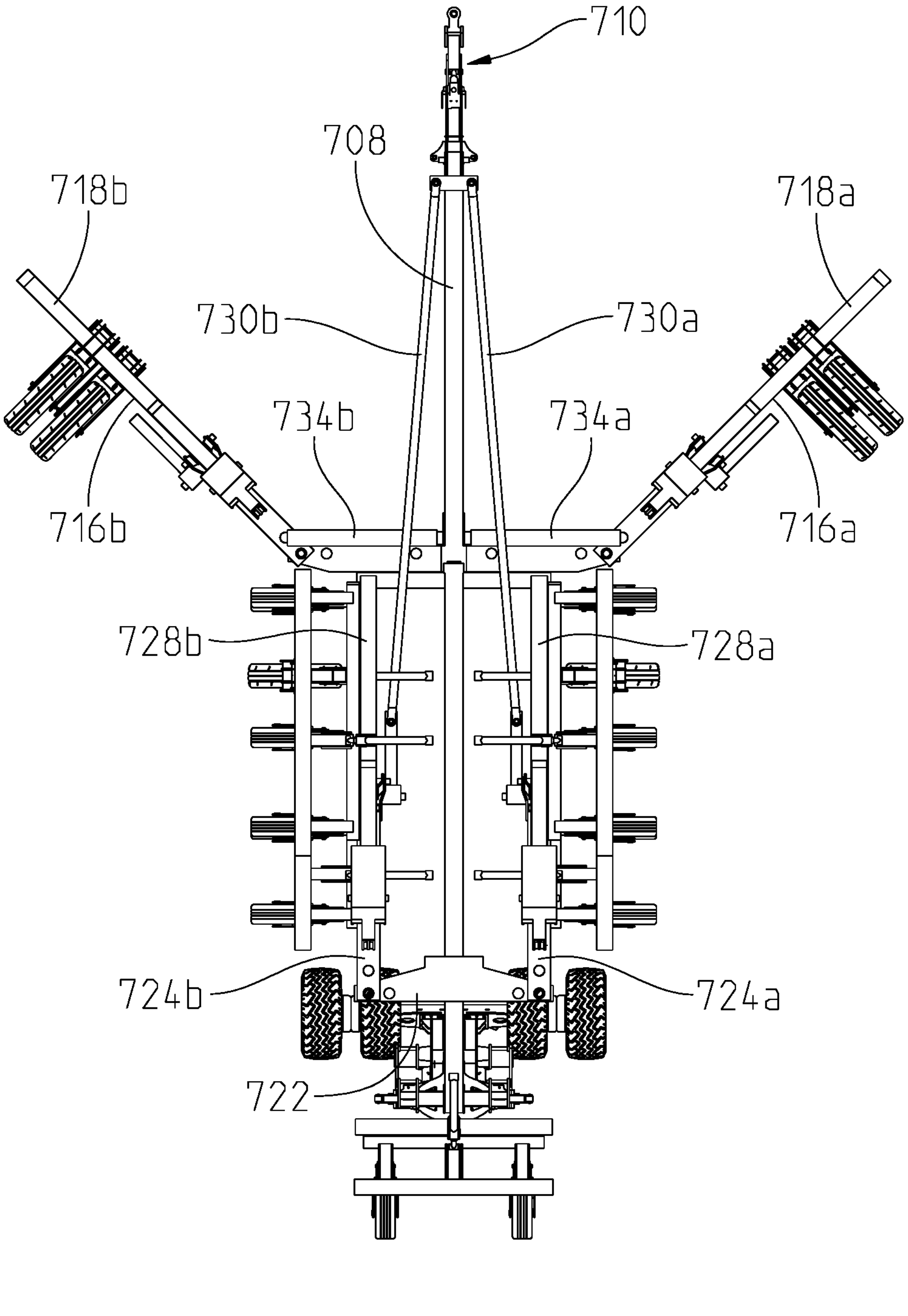
FIG. 9*f* is a top view of the agricultural assembly of FIG. 7*a* with the second toolbar assembly in a partially folded configuration.
Figure 9G:
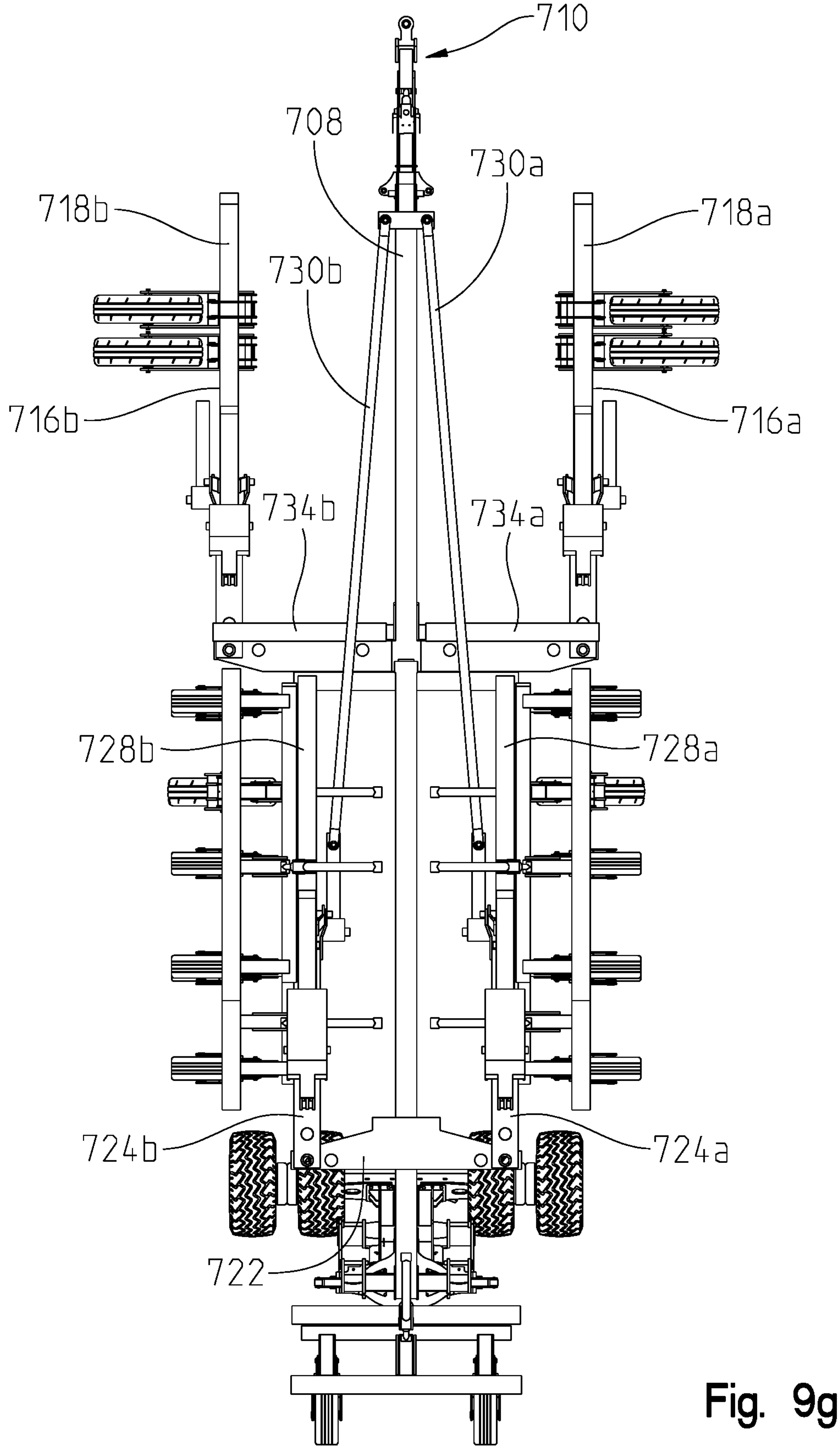
FIG. 9*g* is a top view of the agricultural assembly of FIG. 7*a* in the transport configuration.
Figure 9H:
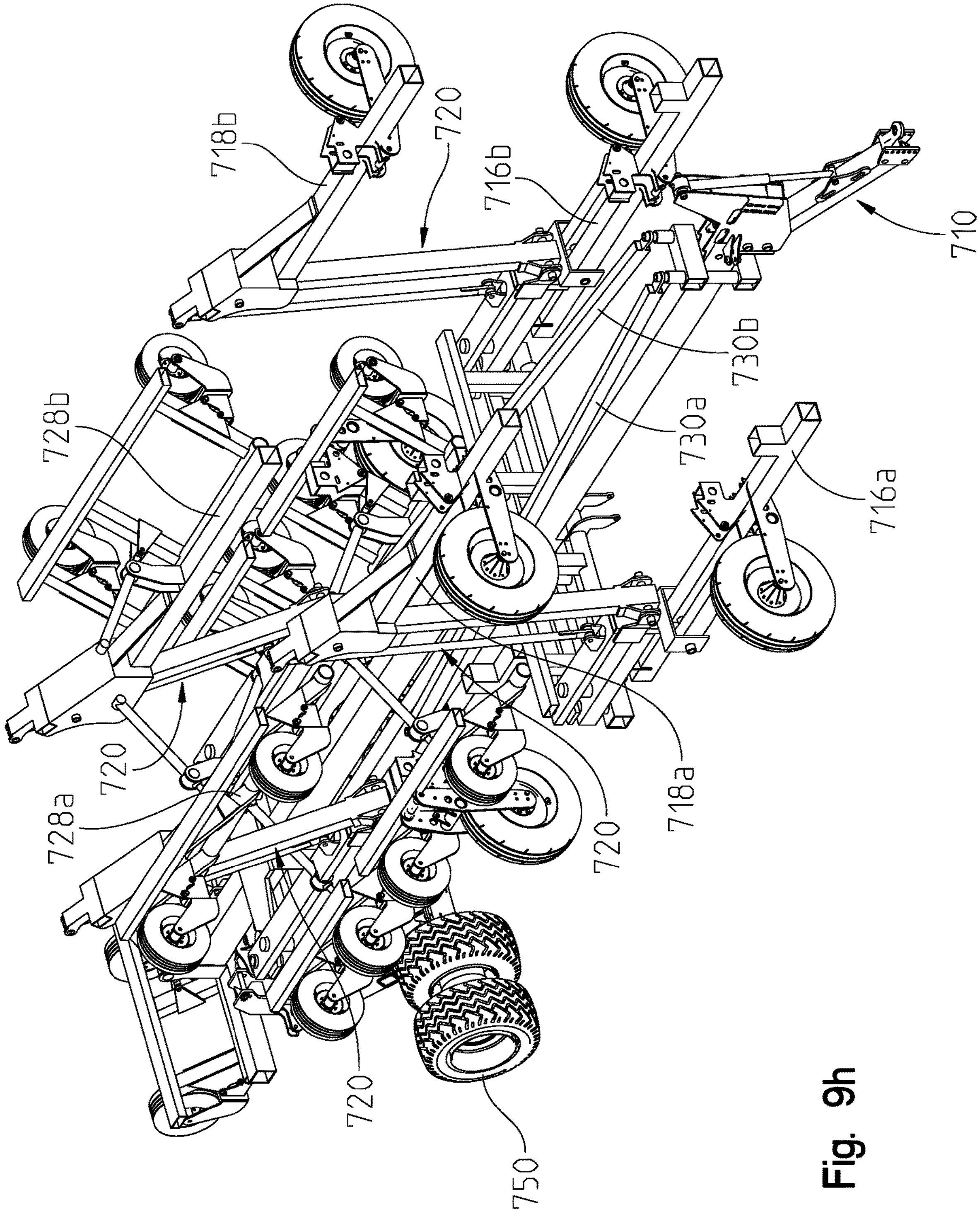
FIG. 9*h* is an elevated perspective view of the agricultural assembly of FIG. 7*a* in the transport configuration.
Figure 10A:
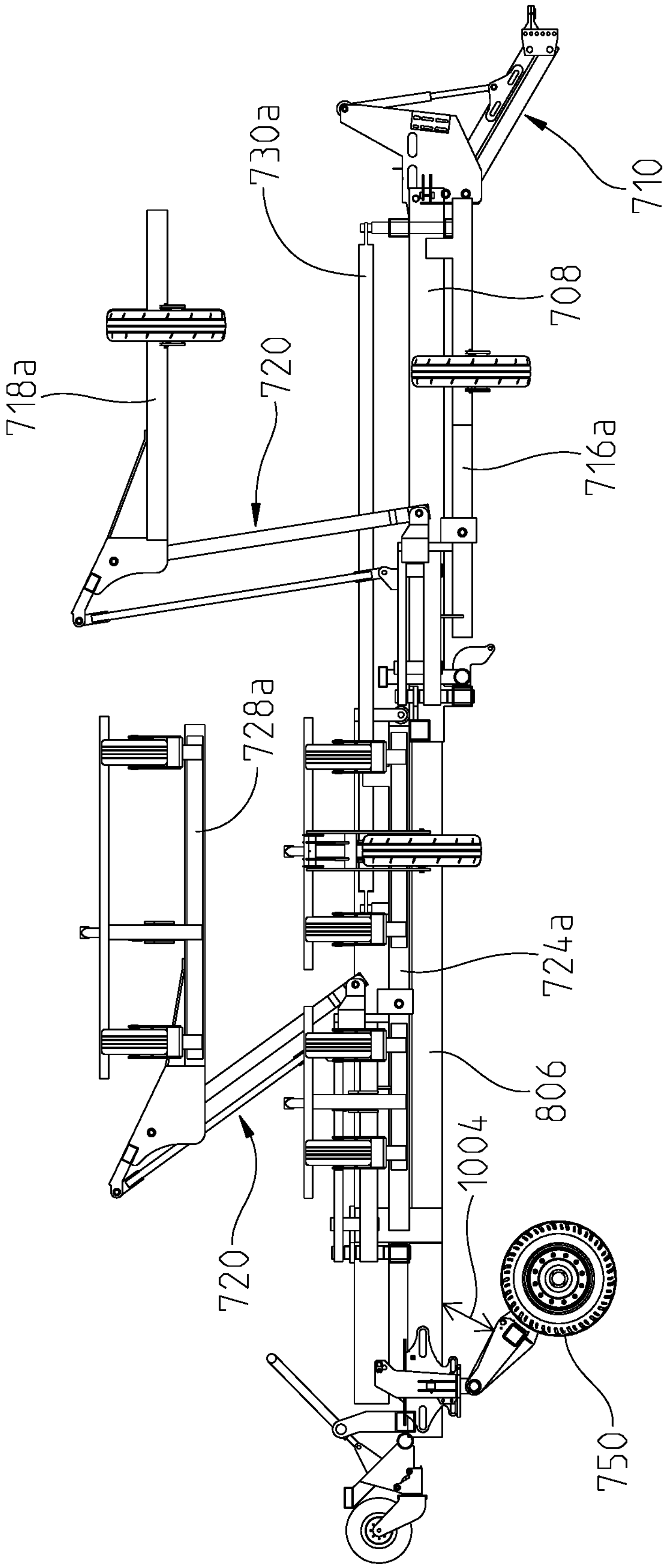
FIG. 10*a* is a side view of the agricultural assembly of FIG. 7*a* in the transport configuration.

Referring now to FIGS. 9a-9g, several configurations of the agricultural assembly 700 are illustrated as it transitions from the planting configuration of FIG. 9a to the transport configuration of FIGS. 9g-9h and FIG. 10a. In the planting configuration of FIG. 9a, the first toolbar assembly 702 and second toolbar assembly 704 are in the fully extended position wherein they position row units 108, 108p across the width of the agricultural assembly 700 to selectively distribute commodity in the underlying surface with substantially even row spacing. In FIG. 9b, the rearward wing extensions 728a, 728b have been moved with the corresponding four-bar linkage 720 to the stacked position wherein the wing extensions 728a, 728b, and any row units 108 coupled thereto, are positioned at least partially above the corresponding rearward side wings 724a, 724b. In FIG. 9c, the second center section 720 has slid partially away from the first center section 714 through a sliding relationship of a sub frame 806 within the frame 708 of the first center section 714. As the second center section 720 slides away from the first center section 714, the rearward side wings 724a, 724b pivot about the second wing pivots 804a, 804b as the linkages 730a, 730b pivot the rearward side wings 724a, 724b forward toward the longitudinal axis 706. In FIG. 9d, the second center section 720 is fully extended from the first center section 714 and the linkages 714 have pulled the rearward side wings 724a, 724b, and the stacked rearward wing extensions 728a, 728b, to the transport positioned wherein they are aligned substantially adjacent to, and parallel with, the sub frame 806.

In FIG. 9*e*, the forward wing extensions 718*a*, 718*b* of the first toolbar assembly 702 are moved to the stacked configuration at least partially above the corresponding forward side wings 716*a*, 716*b*. Further, the first and second pivotal toolbar assemblies 734*a*, 734*b* are transitioned to the vertical orientation to provide appropriate clearance for the row unit 108*p* of the corresponding first side wings 716*a*, 716*b* to fold inwardly. In FIG. 9*f* actuators extending from the frame 708 to the corresponding forward side wings 716*a*, 716*b* have been engaged to begin pivoting the forward side wings 716*a*, 716*b*, and stacked forward wing extensions 718*a*, 718*b*, inwardly about the corresponding first wing pivots 802*a*, 802*b*. In FIG. 9*g*, the actuators have fully transitioned the first toolbar assembly 702 to the transport configuration wherein the forward side wings 716*a*, 716*b* are substantially adjacent to, and parallel with, the frame 708.

Figure 10B:
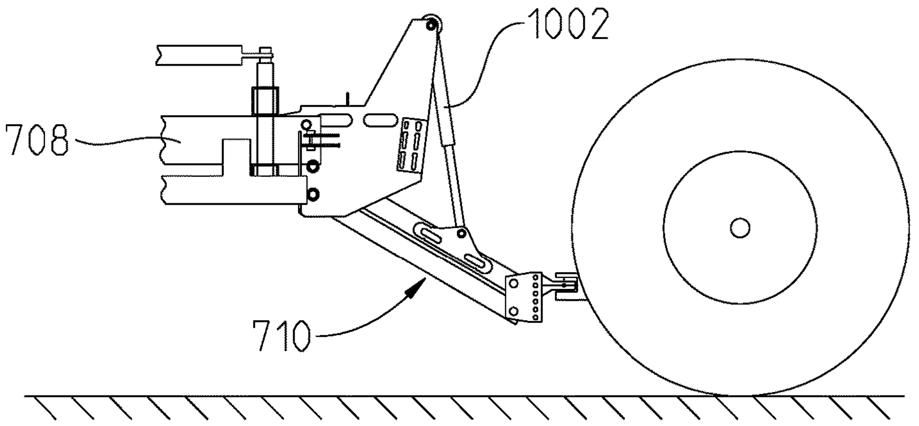
FIG. 10*b* is a side view of a hitch assembly of the agricultural assembly of FIG. 7*a* in the raised configuration.

In another aspect of this disclosure, the hitch assembly 710 may be pivotally coupled to the frame 708 such that a hitch actuator 1002 may selectively alter the angle between the hitch 710 and the frame 708. In the example illustrated in FIGS. 10*b*-10*c*, the hitch assembly 710 may have a four-bar linkage between a hitch mount and the frame 708 such that altering the hitch actuator 1002 raises or lowers the frame 708 while maintaining a substantially level frame orientation.

Figure 10C:
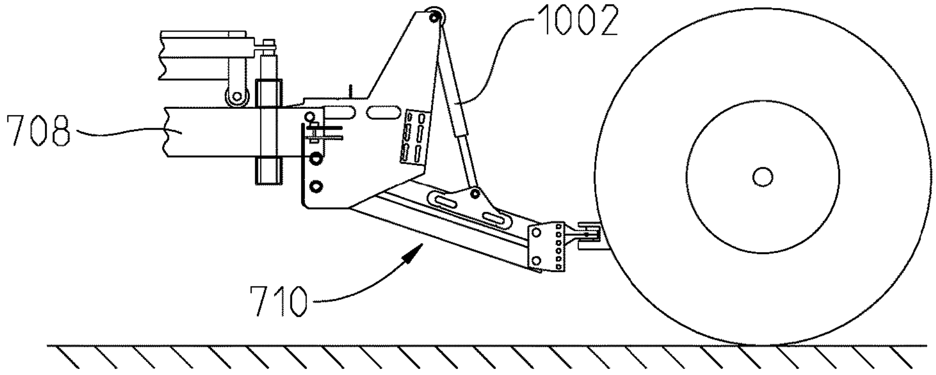
FIG. 10*c* is a side view of the hitch assembly of the agricultural assembly of FIG. 7*a* in a partially raised configuration.
Figure 10D:
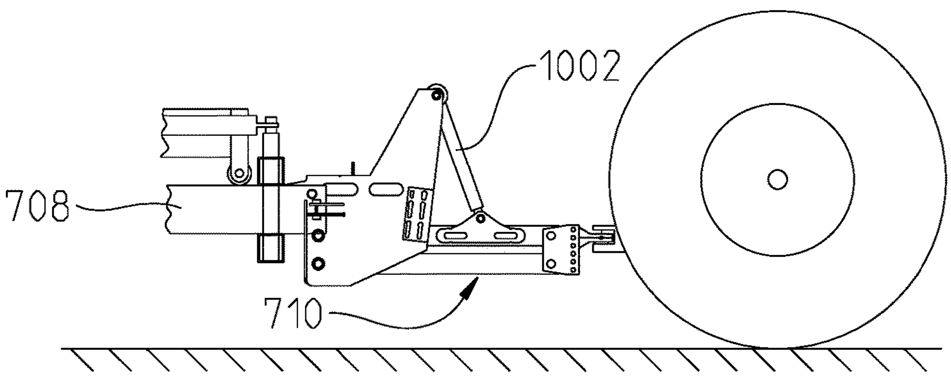
FIG. 10*d* is a side view of the hitch assembly of the agricultural assembly of FIG. 7*a* in the lowered configuration.

One or more wheel actuator 1004 may also be coupled between the second center section 720 and the corresponding primary wheel 750 to selectively alter distance of the primary wheel 750 from the second center section 720. In this embodiment, the hitch actuator 1002 may be altered along with the one or more wheel actuator 1004 to space the first and second toolbar assemblies 702, 704 farther from the underlying surface in the transport configuration. Raising the first and second toolbar assemblies 702, 704 may ensure the corresponding caster wheels 752 do not contact the underlying surface in the transport configuration. For example, in FIG. 10*b* the hitch assembly 710 may be maintained in the raised position via the hitch actuator 1002. In FIG. 10*c* the hitch actuator 1002 transitioned the hitch assembly 710 and frame 708 to an intermediate position. In FIG. 10*d* the hitch actuator 1002 transitioned the hitch assembly 710 and frame 708 to the planting configuration. In each configuration of the hitch assembly 708, the wheel actuator 1004 may be similarly manipulated to ensure the frame 708 remains substantially level as it is raised or lowered relative to the underlying surface.

In one aspect of this disclosure, neither the agricultural assemblies 100, 700 invert the row units 108, 108*p* in the transport configuration. Accordingly, the row units 108, 108*p* are not exposed to potential water ingress issues that may occur if the row unit 108, 108*p* was inverted in the transport configuration.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural assembly, comprising:

a frame;

a hitch assembly coupled to the frame and configured to selectively couple the frame to a work machine;

a first tool bar assembly configured to receive at least one row unit assembly, the first toolbar assembly being foldable in a first direction towards the hitch assembly; and a second tool bar assembly configured to receive at least one row unit assembly, the second toolbar assembly being foldable in the first direction towards the hitch assembly;

wherein the agricultural assembly is movable between a planting configuration and a transport configuration;

wherein both the first tool bar assembly and the second tool bar assembly fold towards the hitch assembly as the first tool bar and second tool bar transition from the planting configuration to the transport configuration;

wherein the first tool bar assembly has a first center section with a first forward side wing pivotally coupled to the first center section on one side and a second forward side wing pivotally coupled to the first center section on the other side, wherein the first and second forward side wing are pivotable relative to the first center section in the first direction;

wherein the second tool bar assembly comprises a second center section and first rearward side wing and a second rearward side wing pivotally coupled to the second center section on opposing sides, wherein the second center section is slidable axially along a longitudinal axis relative to the first center section to transition the second toolbar assembly between the planting configuration and the transport configuration;

wherein the first center section is slidably coupled to the frame to move axially along the longitudinal axis relative to the frame to selectively pivot the first and second forward side wings between the planting configuration and the transport configuration.

2. The agricultural assembly of claim 1, wherein in the transport configuration the second center section is spaced from the first center section sufficiently far to allow the first and second rearward side wings to pivot to the transport configuration wherein the first and second rearward side wings are axially behind the first center section along the longitudinal axis relative to the hitch assembly.

3. The agricultural assembly of claim 1, wherein the at least one row unit coupled to the second tool bar assembly is coupled to a rockshaft of the second tool bar assembly, wherein the rockshaft pivots the at least one row unit between the planting configuration and the transport configuration.

4. An agricultural assembly, comprising:

a frame;

a hitch assembly coupled to the frame and configured to selectively couple the frame to a work machine;

a first tool bar assembly configured to receive at least one row unit assembly, the first toolbar assembly being foldable in a first direction towards the hitch assembly; and a second tool bar assembly configured to receive at least one row unit assembly, the second toolbar assembly being foldable in the first direction towards the hitch assembly;

wherein the agricultural assembly is movable between a planting configuration and a transport configuration;

wherein both the first tool bar assembly and the second tool bar assembly fold towards the hitch assembly as the first tool bar and second tool bar transition from the planting configuration to the transport configuration;

wherein, in the planting configuration, the first toolbar assembly positions at least one row unit a first row unit offset from a wheel axis and the second toolbar assembly positions at least one row unit a second row unit offset from the wheel axis, wherein the first and second row unit offsets are about the same and configured to provide consistent row spacing of the agricultural assembly in turning conditions.

5. The agricultural assembly of claim 1, wherein the second center section is slidably coupled to the frame through the first center section such that axial movement of the first center section relative to the frame causes axial movement of the second center section relative to the frame.

6. The agricultural assembly of claim 5, wherein the second center section is slidable along the longitudinal axis relative to the first center section to selectively pivot the first and second rearward side wings between the planting configuration and the transport configuration.

7. The agricultural assembly of claim 1, further comprising a first forward wing extension movably coupled to the first forward side wing and a second forward wing extension movably coupled to the second forward side wing, wherein the first and second forward wing extensions are movable relative to the first and second forward side wings to be positioned at least partially above the respective first and second forward side wing in the transport configuration.

8. The agricultural assembly of claim 7, further comprising a first forward four bar linkage assembly coupling the first forward wing extension to the first forward side wing and a second forward four bar linkage assembly coupling the second forward wing extension to the second forward side wing.

9. The agricultural assembly of claim 1, further comprising a first rearward wing extension movably coupled to the first rearward side wing and a second rearward wing extension movably coupled to the second rearward side wing, wherein the first and second rearward wing extensions are movable relative to the first and second rearward side wings to be positioned at least partially above the corresponding first and second rearward side wing in the transport configuration.

10. The agricultural assembly of claim 9, further comprising a third four bar linkage assembly coupling the first rearward wing extension to the first rearward side wing and a fourth four bar linkage assembly coupling the second rearward wing extension to the second rearward side wing.

11. The agricultural assembly of claim 1, further comprising:

a first forward wing extension movably coupled to the first forward side wing;

a second forward wing extension movably coupled to the second forward side wing;

a first rearward wing extension movably coupled to the first rearward side wing; and a second rearward wing extension movably coupled to the second rearward side wing;

wherein the first and second forward wing extensions are movable relative to the corresponding first and second forward side wings and the first and second rearward wing extensions are movable relative to the first and second rearward side wings to be positioned at least partially above the corresponding first and second forward side wings or the first and second rearward side wings in the transport configuration.

12. The agricultural assembly of claim 11, wherein each of the first and second forward wing extensions and first and second rearward wing extensions are movably coupled to the corresponding first and second forward side wings or first and second rearward side wings through separate four bar linkage assemblies.

13. The agricultural assembly of claim 4, wherein the first center section is fixedly coupled to the frame and actuators are coupled between each of the first and second forward side wings and at least one of the frame or the first center section to selectively pivot the first and second forward side wings between the planting configuration and the transport configuration.

14. The agricultural assembly of claim 4, wherein the at least one row unit coupled to the first tool bar assembly is a push row unit and the at least one row unit coupled to the second tool bar assembly is a pull row unit.

15. The agricultural assembly of claim 4, wherein the at least one row unit coupled to the first tool bar assembly and the at least one row unit coupled to the second tool bar assembly are pull row units.

16. The agricultural assembly of claim 1, wherein the first tool bar assembly has a plurality of row units spaced thereon and the second tool bar assembly has a plurality of row units spaced thereon, wherein the plurality of row units on the first tool bar assembly are configured to provide commodity to every other row relative to the plurality of row units on the second tool bar assembly in the planting configuration.

17. The agricultural assembly of claim 1, comprising toolbar wheels coupled to the first toolbar assembly, wherein in the planting configuration the toolbar wheels contact an underlying surface and in the transport configuration the toolbar wheels are raised from the underlying surface.

18. An agricultural assembly, comprising:

a frame;

a hitch assembly coupled to the frame and configured to selectively couple the frame to a work machine;

a first tool bar assembly comprising:

a first center section with a first forward side wing pivotally coupled to the first center section on one side and a second forward side wing pivotally coupled to the first center section on the other side; and a first forward wing extension movably coupled to the first forward side wing and a second forward wing extension movably coupled to the second forward side wing;

a first forward four bar linkage assembly coupling the first forward wing extension to the first forward side wing and a second forward four bar linkage assembly coupling the second forward wing extension to the second forward side wing;

wherein the first and second forward wing extensions are movable relative to the first and second forward side wings to be positioned at least partially above the respective first and second forward side wing in the transport configuration a second tool bar assembly comprising:

a second center section and first rearward side wing and a second rearward side wing pivotally coupled to the second center section on opposing sides;

a first rearward wing extension movably coupled to the first rearward side wing and a second rearward wing extension movably coupled to the second rearward side wing, wherein the first and second rearward wing extensions are movable relative to the first and second rearward side wings to be positioned at least partially above the corresponding first and second rearward side wing in the transport configuration;

wherein both the first tool bar assembly and the second tool bar assembly fold towards the hitch assembly as the first tool bar and second tool bar transition from a planting configuration to a transport configuration;

wherein the first center section is slidably coupled to the frame to move axially along the longitudinal axis relative to the frame to selectively pivot the first and second forward side wings between the planting configuration and the transport configuration.

* * * * *